(12) United States Patent
Kondo et al.

(10) Patent No.: US 7,523,051 B2
(45) Date of Patent: Apr. 21, 2009

(54) INFORMATION PROCESSING APPARATUS, INFORMATION PROCESSING METHOD, AND PROGRAM

(75) Inventors: Tetsujiro Kondo, Tokyo (JP); Yoshinori Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 677 days.

(21) Appl. No.: 10/343,296

(22) PCT Filed: May 24, 2002

(86) PCT No.: PCT/JP02/05044

§ 371 (c)(1), (2), (4) Date: Jan. 29, 2003

(87) PCT Pub. No.: WO02/099695

PCT Pub. Date: Dec. 12, 2002

(65) Prior Publication Data

US 2003/0191695 A1    Oct. 9, 2003

(51) Int. Cl.
*G06F 17/30* (2006.01)

(52) U.S. Cl. .......................................... 705/27; 705/26

(58) Field of Classification Search .................. 705/26, 705/27
See application file for complete search history.

(56) References Cited

U.S. PATENT DOCUMENTS 5,819,267 A    10/1998  Uyama

| | | | |
|---|---|---|---|
| 5,924,072 A * | 7/1999 | Havens | 705/1 |
| 6,339,774 B1 * | 1/2002 | Nakayama et al. | 707/10 |
| 7,031,952 B1 * | 4/2006 | Heumann et al. | 707/1 |
| 2002/0049738 A1 * | 4/2002 | Epstein | 707/1 |
| 2002/0087496 A1 * | 7/2002 | Stirpe et al. | 706/45 |

FOREIGN PATENT DOCUMENTS

| | | |
|---|---|---|
| JP | 09-016677 | 1/1997 |
| JP | 10-083386 | 3/1998 |
| JP | 10-171819 | 6/1998 |
| KR | 1997 0071331 | 11/1997 |

OTHER PUBLICATIONS

Chislenko, Alexander; "Collaborative Information Filtering and Sematic Transports," Internet Archive Wayback Machine; www.archive.ogr; www.lucifer.com/...sasha/articles/ACF.html; 1997, 14pgs.*

* cited by examiner

*Primary Examiner*—Robert M. Pond
(74) *Attorney, Agent, or Firm*—Frommer Lawrence & Haug LLP; William S. Frommer; Thomas F. Presson

(57) ABSTRACT

An information processor is provided which allows to provide highly reliable information. Information from various information providers is stored. In addition, the reliability of the information is calculated by inputting an evaluation based on a result of use of the provided information or an actual processing result based on the provided information. The reliability of a provider of each information is calculated for each category and a highly-reliable-provider database is established. An information user (buyer) can extract highly reliable providers from the highly reliable provider database and can use or buy information provided by the extracted providers. Thus, highly reliable information can be selected from many pieces of information.

35 Claims, 34 Drawing Sheets

FIG. 2

| INFORMATION NO. | INFORMATION PROVIDER ID | SATIS-FACTION VOTES | DISSATIS-FACTION VOTES | RELIABILITY | INFORMATION CATEGORIES | INFORMATION BODIES |
|---|---|---|---|---|---|---|
| 1 | 50 | 80 | 30 | 72 | 1-1 | RESTAURANT INFORMATION IN PARIS |
| 2 | 24 | 50 | 40 | 55 | 2-2 | HOTEL INFORMATION IN NY |
| 3 | 32 | 100 | 5 | 95 | 3-3 | GIFT INFORMATION IN LONDON |
| .. | .. | .. | .. | .. | .. | .. |
| 100 | 50 | 5 | 95 | 5 | 1-3 | GIFT INFORMATION IN PARIS |

| PARIS | 1 |
|---|---|
| NY | 2 |
| LONDON | 3 |
| : | : |
| BEIJING | 1 0 0 |

(b)

| RESTAURANT INFORMATION | 1 |
|---|---|
| HOTEL INFORMATION | 2 |
| GIFT INFORMATION | 3 |
| : | : |
| TOURIST RESORT GENERAL INFORMATION | 1 0 0 |

FIG. 4

| IDENTIFICATION NUMBERS | PERSONAL INFORMATION ||||||| RELIABILITY |
| --- | --- | --- | --- | --- | --- | --- | --- | --- |
| | NAMES | ADDRESSES | AGES | PASS-WORDS | QUESTION-ABLE FLAG | INFORMATION SELLABLE FLAG | ... | |
| 1 | YAMADA | | | | | | | 5 |
| 2 | TANAKA | | | | | | | 80 |
| 3 | SUZUKI | | | | | | | 75 |
| .. | .. | | | | | | | .. |
| 100 | SATO | | | | | | | 25 |

FIG. 5

| DB OF PEOPLE HAVING PARIS INFORMATION |||||
|---|---|---|---|---|
| INFOR-MATION PRO-VIDER ID | SATIS-FAC-TION VOTES | DIS-SATIS-FAC-TION VOTES | RELI-ABIL-ITY | |
| 3 | 700 | 50 | 93 | .. |
| .. | | | | |
| 1 | 850 | 700 | 55 | .. |
| .. | | | | |
| 50 | 530 | 950 | 36 | .. |
| .. | | | | |

| DB OF PEOPLE HAVING LONDON INFORMATION |||||
|---|---|---|---|---|
| INFOR-MATION PRO-VIDER ID | SATIS-FAC-TION VOTES | DIS-SATIS-FAC-TION VOTES | RELI-ABIL-ITY | |
| 18 | : | : | : | .. |
| .. | | | | |
| 80 | : | : | : | .. |
| .. | | | | |
| 77 | : | : | : | .. |
| .. | | | | |

| DB OF PEOPLE HAVING TOKYO INFORMATION |||||
|---|---|---|---|---|
| INFOR-MATION PRO-VIDER ID | SATIS-FAC-TION VOTES | DIS-SATIS-FAC-TION VOTES | RELI-ABIL-ITY | |
| 5 | : | : | : | .. |
| .. | | | | |
| 170 | : | : | : | .. |
| .. | | | | |
| 33 | : | : | : | .. |
| .. | | | | |

| DB OF PEOPLE HAVING BRAZIL INFORMATION |||||
|---|---|---|---|---|
| INFOR-MATION PRO-VIDER ID | SATIS-FAC-TION VOTES | DIS-SATIS-FAC-TION VOTES | RELI-ABIL-ITY | |
| 36 | : | : | : | .. |
| .. | | | | |
| 41 | : | : | : | .. |
| .. | | | | |
| 250 | : | : | : | .. |
| .. | | | | |

| INFORMATION NO. | INFORMATION PROVIDER ID | SATIS-FACTION VOTES | DISSATIS-FACTION VOTES | RELIABILITY | INFORMATION CATEGORIES | INFORMATION BODIES |
|---|---|---|---|---|---|---|
| 1 | 50 | 80 | 30 | 72 | 1-1 | RESTAURANT INFORMATION IN PARIS |
| 2 | 24 | 50 | 40 | 55 | 2-2 | HOTEL INFORMATION IN NY |
| 3 | 32 | 100 | 5 | 95 | 3-3 | GIFT INFORMATION IN LONDON |
| .. | .. | .. | .. | .. | .. | .. |
| 100 | 50 | 5 | 95 | 5 | 1-3 | GIFT INFORMATION IN PARIS |
| 101 | 100 | 0 | 0 | 0 | 1-3 | HOTEL INFORMATION IN PARIS |

NEW INFORMATION IS ADDED

FIG. 10

(a) BEFORE UPDATE

| INFORMATION NO. | INFORMATION PROVIDER ID | SATISFACTION VOTES | DISSATIS-FACTION VOTES | RELIABILITY | INFORMATION CATEGORIES | INFORMATION BODIES |
|---|---|---|---|---|---|---|
| 1 | 50 | 80 | 30 | 72 | 1-1 | RESTAURANT INFORMATION IN PARIS |
| 2 | 24 | 50 | 40 | 55 | 2-2 | HOTEL INFORMATION IN NY |
| 3 | 32 | 100 | 5 | 95 | 3-3 | GIFT INFORMATION IN LONDON |
| .. | .. | .. | .. | .. | .. | .. |
| 100 | 50 | 5 | 95 | 5 | 1-3 | GIFT INFORMATION IN PARIS |
| 101 | 100 | 1 | 3 | 25 | 1-3 | HOTEL INFORMATION IN PARIS |

⇒ VOTE INFORMATION NO.[101] FOR SATISFACTION ⇒

(b) AFTER UPDATE

| INFORMATION NO. | INFORMATION PROVIDER ID | SATISFACTION VOTES | DISSATISFAC-TION VOTES | RELIABILITY | INFORMATION CATEGORIES | INFORMATION BODIES |
|---|---|---|---|---|---|---|
| 1 | 50 | 80 | 30 | 72 | 1-1 | RESTAURANT INFORMATION IN PARIS |
| 2 | 24 | 50 | 40 | 55 | 2-2 | HOTEL INFORMATION IN NY |
| 3 | 32 | 100 | 5 | 95 | 3-3 | GIFT INFORMATION IN LONDON |
| .. | .. | .. | .. | .. | .. | .. |
| 100 | 50 | 5 | 95 | 5 | 1-3 | GIFT INFORMATION IN PARIS |
| 101 | 100 | 2 | 3 | 40 | 1-3 | HOTEL INFORMATION IN PARIS |

FIG. 22

| INFORMATION PROVIDER ID | NUMBER OF SUCCESSES | NUMBER OF FAILURES | RELIABILITY |
|---|---|---|---|
| 3 | 7 | 2 | 7 8 |
| ⋮ | ⋮ | ⋮ | ⋮ |
| 1 | 8 | 7 | 5 4 |
| ⋮ | ⋮ | ⋮ | ⋮ |
| 5 0 | 5 | 9 | 3 6 |
| ⋮ | ⋮ | ⋮ | ⋮ |

FIG. 26

| IDENTI-FICATION NO. | NAMES | PERSONAL INFORMATION | NUMBER OF SUCCESSES | NUMBER OF FAILURES | RELI-ABILITY | CURRENT INSTRUCTION TYPES | | |
|---|---|---|---|---|---|---|---|---|
| | | | | | | INSTRUC-TION 1 | INSTRUC-TION 2 | INSTRUC-TION 3 |
| 1 | YAMADA | | 100 | 5 | | | | |
| 2 | TANAKA | | 50 | 40 | | | | |
| 3 | SUZUKI | | 80 | 30 | | | | |
| .. | .. | | .. | .. | | | | |
| 100 | SATO | | 10 | 90 | | | | |

INPUT YAMADA'S NEW INSTRUCTION

ADD TO NEW INSTRUCTION DB

| IDENTI-FICATION NO. | NAMES | PERSONAL INFORMATION | NUMBER OF SUCCESSES | NUMBER OF FAILURES | RELI-ABILITY | CURRENT INSTRUCTION TYPES | | | |
|---|---|---|---|---|---|---|---|---|---|
| | | | | | | INSTRUC-TION 1 | INSTRUC-TION 2 | INSTRUC-TION 3 | NEW IN-STRUCTION |
| 1 | YAMADA | | 100 | 5 | | | | | |
| 2 | TANAKA | | 50 | 40 | | | | | |
| 3 | SUZUKI | | 80 | 30 | | | | | |
| .. | .. | | .. | .. | | | | | |
| 100 | SATO | | 10 | 90 | | | | | |

FIG. 29

(a) HIGHLY RELIABLE BUYER DATA

| IDENTIFICATION NO. | NAMES | PERSONAL INFORMATION | NUMBER OF SUCCESSES | NUMBER OF FAILURES | RELIABILITY |
|---|---|---|---|---|---|
| 1 | YAMADA | | 100 | 5 | 90 |
| 2 | TANAKA | | 50 | 40 | 50 |
| 3 | SUZUKI | | 80 | 30 | 20 |

(b) INSTRUCTION FOR INVESTMENT METHOD OF ONE MILLION YEN AND CALCULATION OF FINAL INVESTMENT

| | YAMADA | | TANAKA | | SUZUKI | | CALCULATION FOR INVESTMENT DECISION | INVESTED AMOUNT |
|---|---|---|---|---|---|---|---|---|
| | INSTRUCTION | RELIABILITY | INSTRUCTION | RELIABILITY | INSTRUCTION | RELIABILITY | | |
| COMPANY A | 50 | 90 | 50 | 90 | 50 | 90 | 50*90+30*50+30*20=6600 | 41 |
| COMPANY B | 50 | | 50 | | 50 | | 50*90+10*50+40*20=5800 | 36 |
| COMPANY C | 0 | | 0 | | 0 | | 00*90+60*50+30*20=3600 | 23 |

INFORMATION PROCESSING APPARATUS, INFORMATION PROCESSING METHOD, AND PROGRAM

TECHNICAL FIELD

The present invention relates to an information processing apparatus, information processing method and a program for accumulating information held by various individuals, for storing accumulated information in a database and for using the accumulated information. More particularly, the present invention relates to an information processor, an information processing method and a program for evaluating the reliability, usability and so on by using evaluations by the others and other evaluation standards to provide more reliable and useful information to an information user.

BACKGROUND ART

Recently, the network as an information processing infrastructure has been widely spread. Each individual has a mobile terminal such as a mobile telephone and a mobile computer. Thus, data communication between individuals and obtaining various information from information providers (service providers) are performed frequently.

In the society where information is oversupplied, information received by each individual may include unreliable information as well as reliable information. For example, various kinds of information can be written freely in a message box by using the Internet. However, users do not have a device for determining whether or not the information provided from various information sources is reliable. Basically, the users have to determine the reliability at their own risk.

Promiscuous individuals may write information freely in many information supply services using the Internet or the like. The written information includes truly useful information and, conversely, includes useless information and hazardous information. The information amount can be increased because of the widely spread networks, but the processing for extracting useful information therefrom is significantly difficult.

DISCLOSURE OF INVENTION

The present invention was made in view of the above-described problem. An object of the present invention is to provide an information processor, an information processing method and a program for allowing to extract highly reliable and useful information easily from various kinds of information.

A first aspect of the present invention is an information processor for storing information provided from different kinds of information sources in a database and for executing processing on stored information including:

a provided information database storing information provided from the information sources by corresponding to data for identifying information providing sources;

an evaluation data obtaining device for obtaining evaluation data for the information stored in the provided information database;

a reliability computing device for computing reliability of the provided information based on the evaluation data; and a highly-reliable-information-source extracting device for extracting a highly-reliable information source from the information providing sources of the information stored in the provided information database based on the reliability data calculated by the reliability computing device.

According to one embodiment of the information processor of the present invention, the evaluation data obtaining device may be arranged to obtain satisfaction data, which is obtained as a result of disclosure of the information stored in the provided information database.

According to one embodiment of the information processor of the present invention, the evaluation obtaining device may be arranged to obtain accomplishment data obtained as a processing result based on information stored in the provided information database.

According to one embodiment of the information processor of the present invention, the information processor may further include a highly-reliable-information-source database storing highly reliable information source data extracted by the highly reliable information source extracting device.

According to one embodiment of the information processor of the present invention, the information processor may be arranged to newly calculate reliability data in the reliability computing device based on evaluation data newly obtained by the evaluation data obtaining device and to perform data update by storing the calculated reliability data in the provided information database.

According to one embodiment of the information processor of the present invention, the information processor may be arranged to compare reliability of information stored in the provided information database and a predetermined threshold and to delete the information if the reliability is lower than the threshold.

According to one embodiment of the information processor of the present invention, the highly-reliable-information-source extracting device may be arranged to perform processing for calculating reliability of each information provider based on reliability data added to information from a same information providing source from information stored in the provided information database.

According to one embodiment of the information processor of the present invention, the highly-reliable-information-source extracting device may be arranged to extract information belonging to a same category from information stored in the provided information database and to calculate reliability of each information provider for each category based on reliability data added to information from a same information providing source.

According to one embodiment of the information processor of the present invention, the highly-reliable-information-source extracting device may be further arranged to perform processing for listing reliability of each of the information providers in order of reliability.

According to one embodiment of the information processor of the present invention, the highly-reliable-information-source extracting device may be arranged to perform processing for calculating an average of a plurality of the reliability data as the reliability of each of the information provider.

According to one embodiment of the information processor of the present invention, the reliability computing device may be arranged to calculate a value of reliability by performing computing based on satisfaction data obtained as a result of disclosing information stored in the provided information database, that is, by implementing reliability=a number of satisfaction votes/(a number of satisfaction votes+a number of dissatisfaction votes).

According to one embodiment of the information processor of the present invention, the reliability computing device may be arranged to stop processing for calculating the value of the reliability when the value of (a number of satisfaction votes+a number of dissatisfaction votes) is less than a predetermined threshold.

According to one embodiment of the information processor of the present invention, the reliability computing device may be arranged to calculate a value of reliability by performing computing based on accomplishment data obtained as a processing result based on information stored in the provided information database, that is, by implementing reliability=a number of satisfaction votes/(a number of satisfaction votes+a number of dissatisfaction votes).

According to one embodiment of the information processor of the present invention, the reliability computing device may be arranged to stop processing for calculating the value of the reliability when the value of (a number of satisfaction votes+a number of dissatisfaction votes) is less than a predetermined threshold.

According to one embodiment of the information processor of the present invention, the information processor may be arranged to perform processing for receiving a question from a user, selecting a highly reliable information source extracted by the highly-reliable-information-source extracting device in accordance with a category of the question, transferring the question to an information source registered as the selected highly reliable information source, and transferring an answer obtained from the information source to the user.

According to one embodiment of the information processor of the present invention, when data from a highly reliable information source extracted by the highly-reliable-information-source extracting device is used or is provided to a user, the information processor may be arranged to perform billing processing as a charge of the use.

According to one embodiment of the information processor of the present invention, the information processor may further include an information obtaining device for obtaining information provided from the information source. The information obtaining device may be arranged to perform processing for receiving information sent from a terminal.

According to one embodiment of the information processor of the present invention, the information processor may further include an information obtaining device for obtaining information provided from the information source. The information obtaining device may be arranged to perform processing for receiving information sent from a terminal.

According to one embodiment of the information processor of the present invention, the information processor may further include a verifying device for performing processing for verifying information sent from the information source.

According to one embodiment of the information processor of the present invention, the information processor may further include a result obtaining device for obtaining result data corresponding to the information stored in the provided information database. The evaluation data obtaining device may be arranged to obtain evaluation data created from a result of a comparison between the result data and the information.

A second aspect of the present invention is an information processing method for storing information provided from different kinds of information sources in a database and for executing processing on stored information, including:

an information storing step for storing information provided from the information sources by corresponding to data for identifying information providing sources;

an evaluation data obtaining step for obtaining evaluation data for the information stored in the provided information database;

a reliability computing step for computing reliability of the provided information based on the evaluation data; and a highly-reliable-information-source extracting step for extracting a highly-reliable information source from the information providing sources of the information stored in the provided information database based on the reliability data calculated by the reliability computing step.

According to one embodiment of the information processing method of the present invention, the information processing method may further include the step of storing highly reliable information source data extracted by the highly reliable information source extracting step in a highly-reliable-providing-source database.

According to one embodiment of the information processing method of the present invention, the information processing method may further include the steps of newly calculating reliability data in the reliability computing step based on evaluation data newly obtained by the evaluation data obtaining step and of performing data update by storing the calculated reliability data in the provided information database.

According to one embodiment of the information processing method of the present invention, the information processing method may further include the steps of comparing reliability of information stored in the provided information database and a predetermined threshold and deleting the information if the reliability is lower than the threshold.

According to one embodiment of the information processing method of the present invention, the information processing method may further include the steps of performing processing for receiving a question from a user, selecting a highly reliable information source extracted by the highly-reliable-information-source extracting device in accordance with a category of the question, transferring the question to an information source registered as the selected highly reliable information source, and transferring an answer obtained from the information source to the user.

According to one embodiment of the present invention, the information processing method may include the step of, when data from a highly reliable information source extracted by the highly-reliable-information-source extracting device is used by or is provided to a user, performing billing processing as a charge of the use.

A third aspect of the present invention is a data communication terminal apparatus connected to an information processor having:

a provided information database storing information provided from the information sources by corresponding to data for identifying information providing sources;

an evaluation data obtaining device for obtaining evaluation data for the information stored in the provided information database;

a reliability computing device for computing reliability of the provided information based on the evaluation data; and a highly-reliable-information-source extracting device for extracting a highly-reliable information source from the information providing sources of the information stored in the provided information database based on the reliability data calculated by the reliability computing device. The data communication terminal apparatus include:

an information obtaining device for obtaining the information from the information processor;

an information disclosing device for performing processing for disclosing a content of the information to an evaluator who performs evaluation processing on the obtained information;

an input device for inputting an evaluation for the information; and an information sending device for sending the evaluation of the information to the information obtaining device as the evaluation data.

According to one aspect of a data communication terminal apparatus, the evaluation data may be satisfaction data, which is an evaluation input by the input device as a result of disclosing the information by the information disclosing device.

According to one aspect of a data communication terminal apparatus, the evaluation data may be accomplishment data, which is an evaluation input by the input device as a result of disclosing the information by the information disclosing device.

A fourth aspect of the present invention is a data communication terminal apparatus connected to an information processor having:

a provided information database storing information provided from the information sources by corresponding to data for identifying information providing sources;

an evaluation data obtaining device for obtaining evaluation data for the information stored in the provided information database;

a reliability computing device for computing reliability of the provided information based on the evaluation data; and a highly-reliable-information-source extracting device for extracting a highly-reliable information source from the information providing sources of the information stored in the provided information database based on the reliability data calculated by the reliability computing device. The information processor is arranged to perform processing for receiving a question from a user, selecting a highly reliable information source extracted by the highly-reliable-information-source extracting device in accordance with a category of the question, transferring the question to an information source registered as the selected highly reliable information source, and transferring an answer obtained from the information source to the user. The data communication terminal apparatus includes:

a question receiving device for receiving a question from the user, which is transferred from the information processor to the highly reliable information source;

a question presenting device for presenting the question to a question answerer;

an input device for inputting an answer to the question; and an answer sending device for sending an answer input through the input device to the information processor.

A fifth aspect of the present invention is a data communication terminal apparatus connected to an information processor having:

a provided information database storing information provided from the information sources by corresponding to data for identifying information providing sources;

an evaluation data obtaining device for obtaining evaluation data for the information stored in the provided information database;

a reliability computing device for computing reliability of the provided information based on the evaluation data; and a highly-reliable-information-source extracting device for extracting a highly-reliable information source from the information providing sources of the information stored in the provided information database based on the reliability data calculated by the reliability computing device. The information processor is arranged to perform processing for receiving a question from a user, selecting a highly reliable information source extracted by the highly-reliable-information-source extracting device in accordance with a category of the question, transferring the question to an information source registered as the selected highly reliable information source, and transferring an answer obtained from the information source to the user. The data communication terminal apparatus includes:

an input device for inputting a question from the user;

a question sending device for sending the question to the information obtaining device;

an answer receiving device for receiving an answer to the question from the information processor; and an answer presenting device for presenting an answer received through the answer receiving device to the user.

A sixth aspect of the present invention is a data processing method in a data communication terminal apparatus connected to an information processor, the method including:

an information obtaining step for obtaining information from the information processor;

an information disclosing step for performing processing for disclosing a content of the information to an evaluator who performs evaluation processing on the obtained information;

an input step for inputting an evaluation for the information; and an information sending step for sending the evaluation of the information to the information processor as the evaluation data.

A seventh aspect of the present invention is a data processing method in a data communication terminal apparatus connected to an information processor, the method including:

a question receiving step for receiving a question from a user, which is transferred from the information processor to a highly reliable information source;

a question presenting step for presenting the question to a question answerer;

an input step for inputting an answer to the question; and an answer sending step for sending an answer input by the input step to the information processor.

An eighth aspect of the present invention is a data processing method in a data communication terminal apparatus connected to an information processor, the method including:

a question input step for inputting a question from the user;

a question sending step for sending the question to the information processor;

an answer receiving step for receiving an answer to the question from the information processor; and an answer presenting step for presenting an answer received by the answer receiving step to the user.

A ninth aspect of the present invention is a program for, on a computer system, storing information provided from different kinds of information sources in a database and for executing processing on stored information, including:

an information storing step for storing in a provided information database information provided from the information sources by corresponding to data for identifying information providing sources;

an evaluation data obtaining step for obtaining evaluation data for the information stored in the provided information database;

a reliability computing step for computing reliability of the provided information based on the evaluation data; and a highly-reliable-information-source extracting step for extracting a highly-reliable information source from the information providing sources of the information stored in the provided information database based on the reliability data calculated by the reliability computing step.

A tenth aspect of the present invention is a program for, on a computer system, executing data processing in a data communication apparatus connected to an information processor, including:
    an information obtaining step for obtaining information from the information processor;
    an information disclosing step for performing processing for disclosing a content of the information to an evaluator who performs evaluation processing on the obtained information;
    an input step for inputting an evaluation for the information; and
    an information sending step for sending the evaluation of the information to the information processor as the evaluation data.

An eleventh aspect of the present invention is a program for, on a computer system, executing data processing in a data communication apparatus connected to an information processor, including:
    a question receiving step for receiving a question from a user, which is transferred from the information processor to a highly reliable information source;
    a question presenting step for presenting the question to a question answerer;
    an input step for inputting an answer to the question; and
    an answer sending step for sending an answer input by the input step to the information processor.

A twelfth aspect of the invention is a program for, on a computer system, executing data processing in a data conunmunication apparatus connected to an information processor, including:
    a question input step for inputting a question from a user;
    a question sending step for sending the question to the information processor;
    an answer receiving step for receiving an answer to the question from the information processor; and
    an answer presenting step for presenting an answer received by the answer receiving step to the user.

A thirteenth aspect of the present invention is a program recording medium storing a program for, on a computer system, storing information provided from different kinds of information sources in a database and for executing processing on stored information, the program including:
    an information storing step for storing in a provided information database information provided from information sources by corresponding to data for identifying information providing sources;
    an evaluation data obtaining step for obtaining evaluation data for the information stored in the provided information database;
    a reliability computing step for computing reliability of the provided information based on the evaluation data; and
    a highly-reliable-information-source extracting step for extracting a highly-reliable information source from the information providing sources of the information stored in the provided information database on the reliability data calculated by the reliability computing step.

A fourteenth aspect of the present invention is a program recording medium storing a program for, on a computer system, executing data processing in a data communication apparatus connected to an information processor, the program including:
    an information obtaining step for obtaining information from the information processor;
    an information disclosing step for performing processing for disclosing a content of the information to an evaluator who performs evaluation processing on the obtained information;
    an input step for inputting an evaluation for the information; and
    an information sending step for sending the evaluation of the information to the information processor as the evaluation data.

A fifteenth aspect of the present invention is a program recording medium storing a program for, on a computer system, executing data processing in a data communication apparatus connected to an information processor, the program including:
    a question receiving step for receiving a question from a user, which is transferred from the information processor to a highly reliable information source;
    a question presenting step for presenting the question to a question answerer;
    an input step for inputting an answer to the question; and
    an answer sending step for sending an answer input by the input step to the information processor.

A sixteenth aspect of the present invention is a program recording medium storing a program for, on a computer system, executing data processing in a data communication apparatus connected to an information processor, the program including:
    a question input step for inputting a question from a user;
    a question sending step for sending the question to the information processor;
    an answer receiving step for receiving an answer to the question from the information processor; and
    an answer presenting step for presenting an answer received by the answer receiving step to the user.

A program according to the present invention may be provided by being stored in a computer-readable medium provided to a generic computer system, which can execute various program codes, such as a CD, an FD and an MO. A program according to the present invention may be stored in a computer-readable medium for providing a computer program to a generic computer system, which can execute various program codes. The medium may be a recording medium such as a CD, an FD and an MO or may be a transmission medium such as a network. The form is not especially limited.

The program controls the implementation of different kinds of functions of the system based on the read program under control of a processor. The program shows collaborative operations on the system. The same operational effects as those of the other aspects of the present invention can be obtained.

Other objects, features and advantages of the present invention will be apparent from more detail descriptions based on examples of the present invention, which will be described later, and attached drawings.

BRIEF DESCRIPTION OF THE DRAWINGS

FIG. 2 is a diagram for explaining a data construction example in a provided information database according to the present invention.

FIG. 3 is a diagram for explaining categories of the provided information database according to the present invention.

FIG. 4 is a diagram for explaining a data construction example of an information provider database according to the present invention.

FIG. 5 is a diagram for explaining a data construction example of a highly-reliable provider database according to the present invention.

FIG. 10 is a diagram for explaining a processing example of database updating processing in the vote input processing according to the present invention.

FIG. 22 is a diagram for explaining a data construction example of a highly-reliable provider database according to the present invention.

FIG. 26 is a diagram for explaining a database updating processing example in the information input processing according to the present invention.

FIG. 29 is a diagram for explaining a specific example of using database-storing data according to the present invention.

BEST MODE FOR CARRYING OUT THE INVENTION

An information processor, a data communication terminal apparatus and a method according to the present invention will be described below in detail with reference to drawings.

[Configuration Example 1 of Information processor]

[System Outline]

Figure 1:
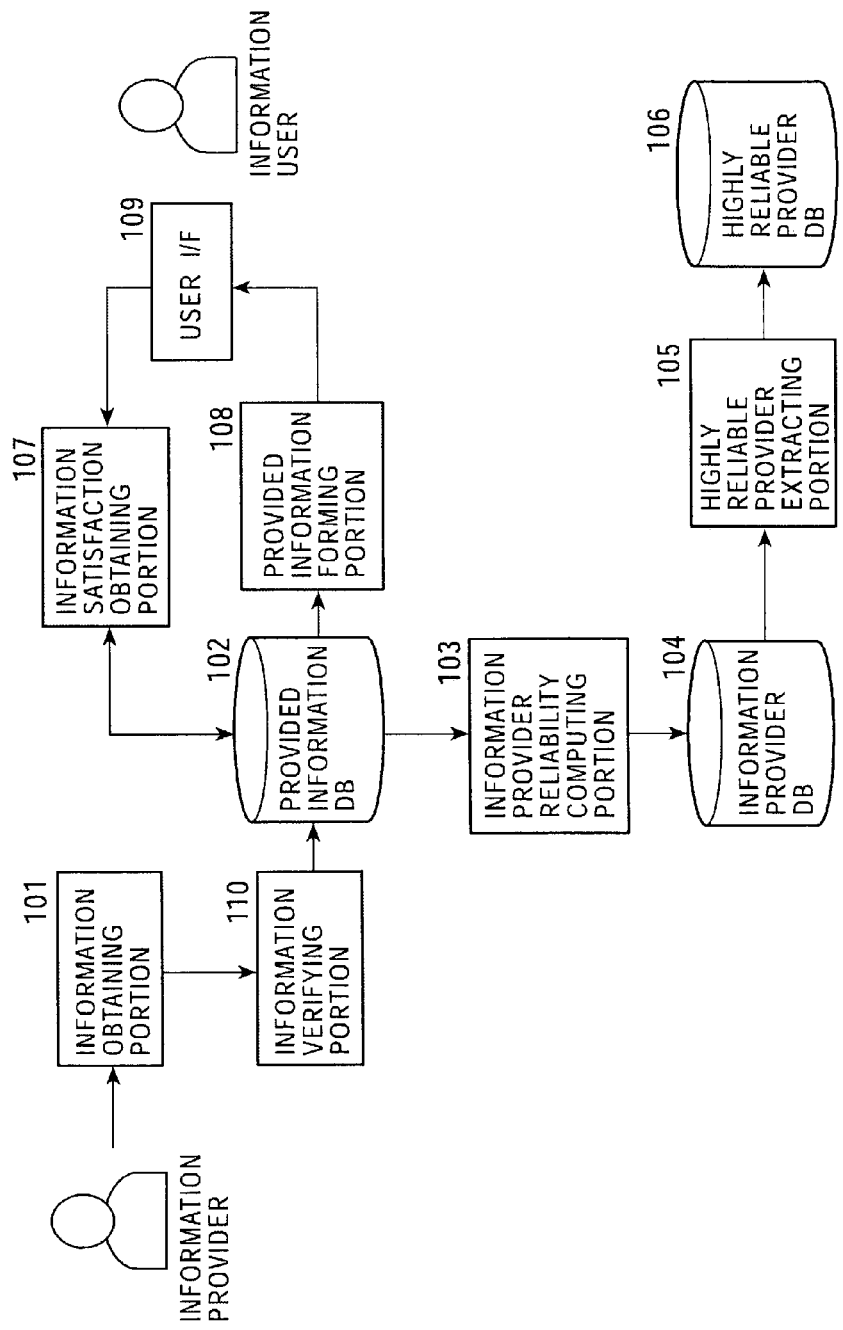
FIG. 1 is a block diagram showing a system configuration example (example 1) of the present invention.

FIG. 1 is a block diagram showing an information processor according to one example of the present invention. First of all, an outline of processing executed in a system of this example will be described with reference to the block diagram in FIG. 1. Information providers for providing information and information users for using information are involved with the information processor. They include promiscuous individuals and parties such as specific information providers.

Information provided by an information provider is obtained through an information obtaining portion 101 of the information processor. The information is verified by an information verifying portion 110 and then is stored in a provided information database (DB) 102. An information provider transmits information through his/her own communication terminal such as a PC and a mobile telephone. The information is received by the information obtaining portion 101 having a communication interface and is stored in the information database (DB) 102.

In order to view information stored in the information database (DB) 102, the information user accesses the information processor through a user I/F 109 of the information processor. The information user transmits a required item such as a category of information to be used, for example. Then, a provided information forming portion 108 extracts and sends data satisfying the requirement from the information database (DB) 102 to the information user. The information user evaluates for satisfaction or dissatisfaction regarding the provided information and sends the evaluation result to the system. An information satisfaction obtaining portion in the system side obtains the evaluation result from the information user and stores the evaluation data in corresponding data in the provided information database 102. Then, reliability data of the provided information is updated.

A construction example of data to be stored in the information database (DB) 102 will be described with reference to FIG. 2. An information number is given, as an identifier, to information provided by an information provider. Each information is provided with an information provider identifier for identifying an information provider, a number of satisfaction votes from information users, a number of dissatisfaction votes from information users and reliability calculated from the numbers of the satisfaction votes and the dissatisfaction votes. The reliability is calculated based on Reliability=satisfaction votes/) satisfaction votes+dissatisfaction votes), for example.

Furthermore, a category of provided information and an information body are stored therein by associating with each other. The categories are defined as those having numbers given to places and types of information, respectively. FIG. 3 shows a diagram for explaining a setting construction of categories. A table (a) shows identification numbers corresponding to placers. A table (b) shows identification numbers corresponding to types of information. For example, the category of restaurant information in Paris is 1-1. The category of gift information in Beijing is 100-3.

The information processor according to the present invention creates an information provider database 104 for accumulating information relating to information providers based on data stored in the information database (DB) 102. FIG. 4 shows a construction example of data stored in the information provider database 104. The information provider database 104 stores names, addresses, ages, passwords, questionable flags, information selling flags and so on in accordance with information provider identifiers, which are identifiers of information providers. A password may be used for authentication for authorizing an access to a database or for authentication of personal identification for checking reward payment such as an information fee to be paid when information is provided to a third party. A questionable flag is a flag for setting whether or not information to be provided is questionable. An information sellable flag is a flag for setting whether or not the information to be provided is sellable.

The information provider database 104 further stores reliability of information providers. If one person provides one piece of information, a value for the reliability calculated based on the equation, Reliability=Satisfaction votes/(satisfaction votes+dissatisfaction votes) is stored in the information provider database 104 like the reliability stored in the information database (DB) 102. If one person provides many pieces of information, the reliability data is stored for each information category. In addition, an average value of a plurality of reliability can be calculated and be stored in the information provider reliability computing portion 103 as the reliability of the information provider.

In the information processor shown in FIG. 1, the highly-reliable-provider extracting portion 105 extracts highly-reliable providers based in the information provider data stored in the information provider database 104. Then, a list of the extracted highly-reliable information providers is stored in the highly-reliable-provider database 106.

A construction example of data stored in the highly-reliable-provider database 106 is shown in FIG. 5. The example shown in FIG. 5 is an example of a data construction in which different degrees of reliability of information providers are aligned from the highest to the lowest for each place, which is an information category. As shown in FIG. 5, information providers who have provided Paris information, London information, Tokyo information and Brazil information are listed in order from those having higher satisfaction votes from the information users, that is, those having higher reliability.

As described above, the information processor of this example has the provided information database (see FIG. 2), the information provider database (see FIG. 4), and the highly-reliable provider database (see FIG. 5). The information supply to information users based on the above-described types of data can support decisions by information users.

[Database Updating Processing for Information Supply]

Figure 6:
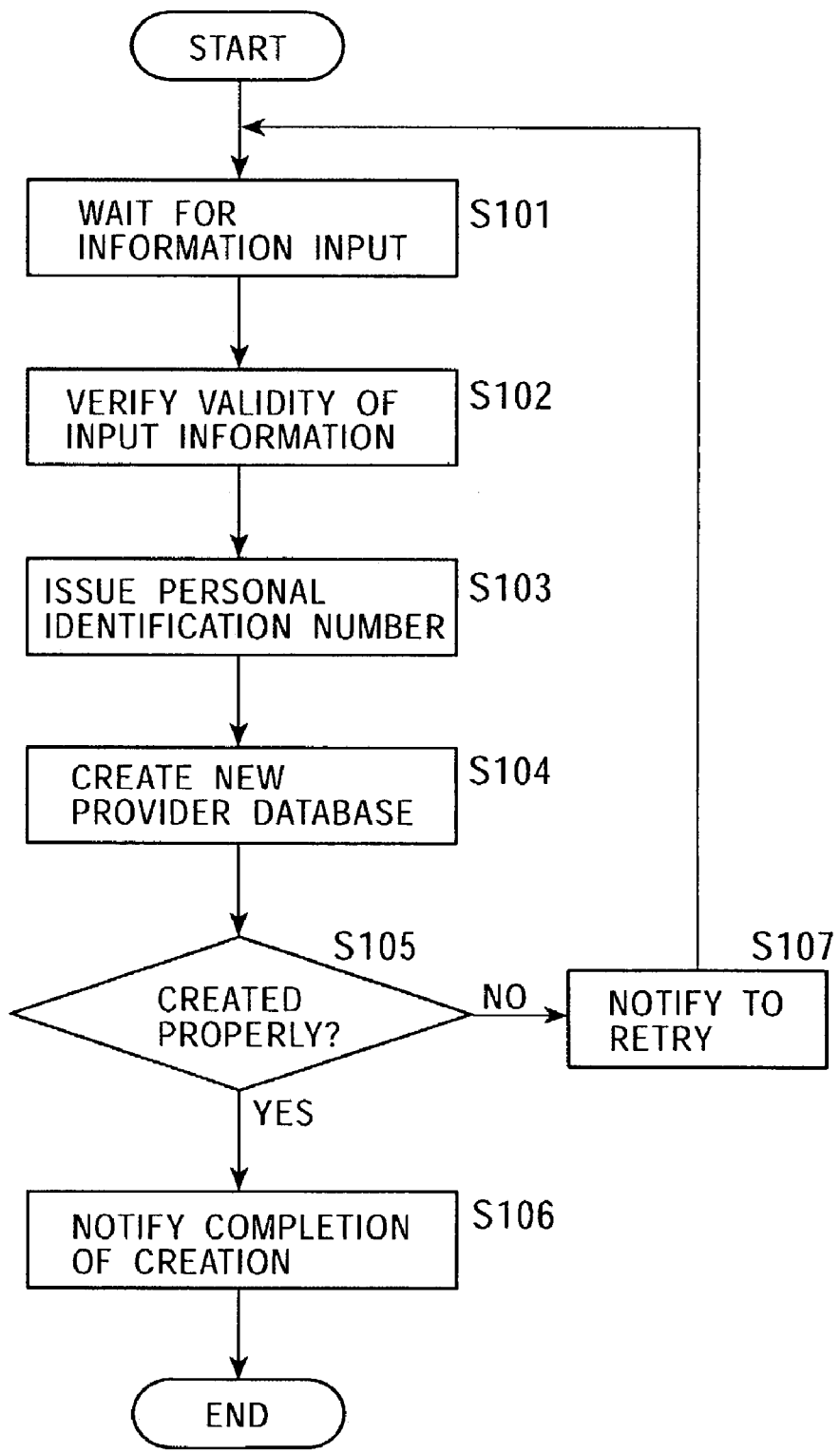
FIG. 6 is a flowchart for explaining database updating processing in new information input processing according to the present invention.

First of all, database updating processing for information supply from a new information provider will be described with reference to a flow in FIG. 6. The information processor according to the present invention waits for an information input (S101) during a data receiving time basically. When information is input from an information provider, the information processing apparatus of the present invention verifies validity of the information (S102). The validity is verified based on whether or not the information is included in the registerable data category, whether the information does not include information unpreferably provided to a third party, such as information criticizing a specific personal and so on.

If the provided information is determined to register in a database, a personal identification number is issued (S103). A database corresponding to a new provider is created (S104). If the database is created properly (S105, Yes), a notification of the completion of the creation is sent to the information provider (S106). Then, the processing ends. If the database is not created properly (S105, No), a notification of retry is sent to the information provider (S107) for prompting the information provider to input the information again.

The information provided by the information provider in this case is registered in the provided information database 102 (see FIG. 2). The information of the provider is registered in the information in the information provider database 104 (see FIG. 4). Here, the information has not been used or been evaluated. Therefore, each of the satisfaction votes, the dissatisfaction votes and the reliability in the provided information database 102 (see FIG. 2) is set at 0 as the initial value.

Figure 7:
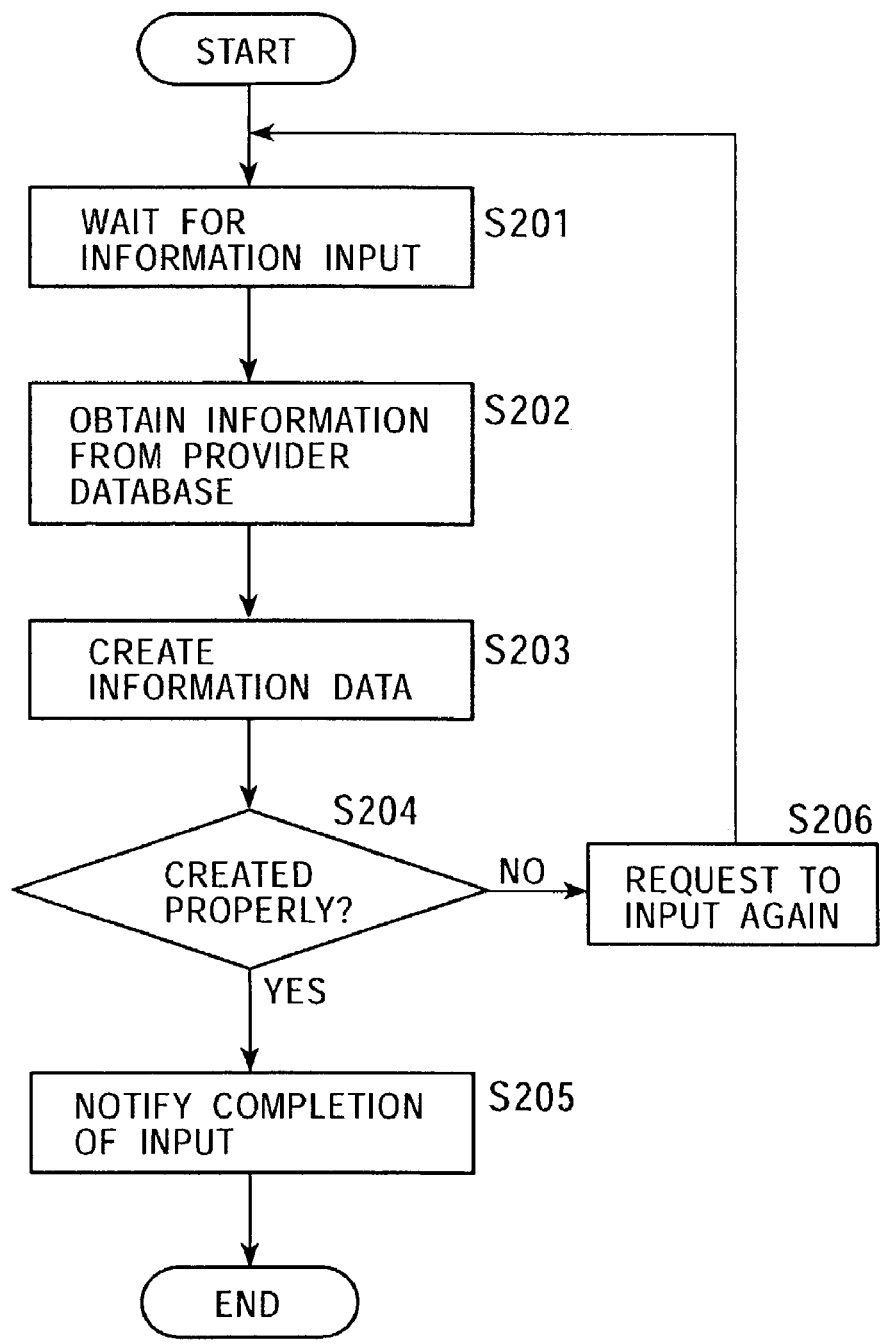
FIG. 7 is a flowchart for explaining database updating processing in information input processing according to the present invention.

Next, the processing for updating the database when information is provided from an information provider registered in the information provider database 104 (see FIG. 4) will be described with reference to a flow in FIG. 7. When information is input from an information provider at a state where information input is waited (S201), the information provider database 104 (see FIG. 4) is searched based on a transmission ID (information provider identifier) of the information provider. Then, the information relating to the information provider is obtained.

If the information provider is identified as a registered provider and if the provided information is determined to register in the database, information data to be registered in the provided information database 102 (see FIG. 2) is created (S203). If the database is created properly (S204, Yes), a notification for the input completion is sent to the information provider (S205), and the processing ends. If the database is not created properly (S204, No), a notification for re-input is sent to the information provider (S206) for prompting the information provider to input the information again.

The information provider by the information provider in this case is registered in the provided information database 102 (see FIG. 2). Here, the information has not been used and been evaluated. Therefore, each of the satisfaction votes, the dissatisfaction votes and the reliability in the provided information database 102 (see FIG. 2) is set at 0 as the initial value.

Figure 8:
FIG. 8 is a diagram for explaining a processing example of database updating processing in the information inputting processing according to the present invention.

An example of processing for updating the provided information database 102 is shown in FIG. 8. An information number [101] and an information provider ID [100] are given to information provided by a new information provider. Each of the satisfaction votes, the dissatisfaction votes and the reliability is set at 0 as the initial value. A category [1-3] of the information and information body (hotel information in Paris) are stored by associating with each other.

[Processing for Updating Database Involved in Evaluation When Information Is Used]

Figure 9:
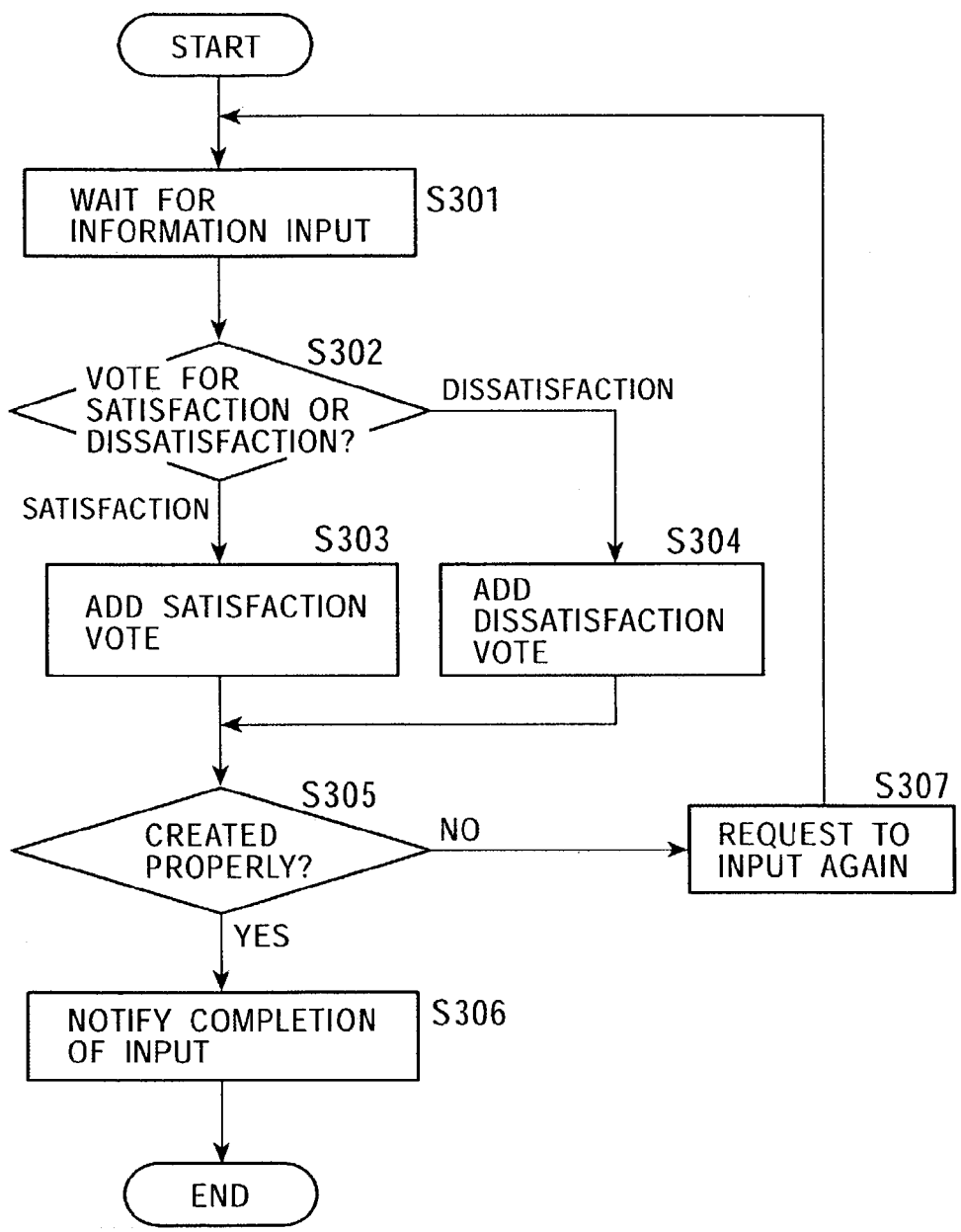
FIG. 9 is a diagram for explaining database updating processing in vote input processing according to the present invention.

The provided information database 102 can be used by the information users. An information user specifies a category and the like of information requested to present and obtains the information. For example, a user who is traveling in Paris can obtain hotel information in Paris from the provided information database 102 and can select a hotel in accordance with the information. The user having used the information can vote for either satisfaction or not with respect to the used information. Voting processing and data updating processing involved in the voting processing will be described with reference to a flow in FIG. 9.

When vote information is input from an information provider during a standby state for information input (S301), the vote information is determined as either satisfaction vote or dissatisfaction vote (S302). If it is the satisfaction vote, a point (+1) is added to the satisfaction votes of the corresponding information (S303). If it is the dissatisfaction vote, a point (+1) is added to the dissatisfaction votes of the corresponding information (S304).

Then, data update is performed on the provided information database 102 (see FIG. 2). If the database is created properly (S305, Yes), a notification for input completion is sent to the information provider (S306). Then, the processing ends. If the database is not created properly (S305, No), a notification for re-input is sent to the information provider (S307) for prompting the information provider to input the information again.

FIG. 10 shows a processing example for updating the provided information database 102. FIG. 10 shows an example where a satisfaction vote is obtained for the information having the information number [101]. The satisfaction votes, the dissatisfaction votes, and the reliability of the information having the information number [101] before update (a) are set at [1], [3], and [25], respectively. When the satisfaction vote processing is performed, the satisfaction votes, the dissatisfaction votes and the reliability are updated to [2], [3] and [40], respectively.

[Processing for Deleting Information With Low Reliability]

Figure 11:
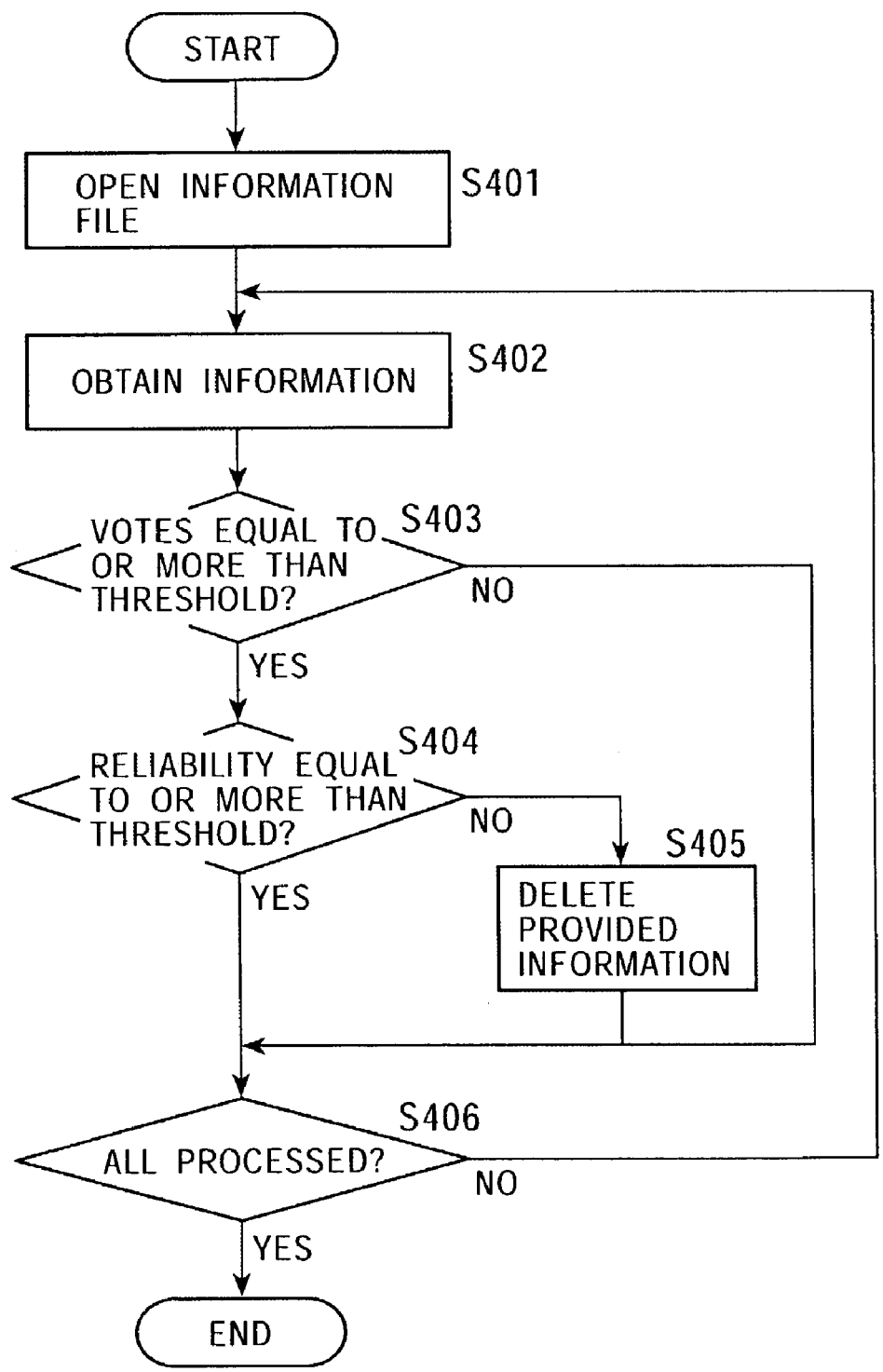
FIG. 11 is a diagram for explaining a processing flow of database updating processing for deleting data with low reliability according to the present invention.

Next, processing for deleting information with low reliability will be described. New data is stored in the provided information database 102 sequentially. However, storing information with low reliability may waste data capacity because it is hardly used. Therefore, information with low reliability is deleted. The processing for deleting information with low reliability will be described with reference to a flow in FIG. 11.

First of all, at a step S401, an information file in the provided information database 102 is opened and stored data is obtained (S402). At a step S403, the total numbers of the satisfaction votes and the dissatisfaction votes for the information in the obtained file are compared with predetermined thresholds. When the number of votes are under a threshold, 100, for example, it is determined that more votes are required for finally determining the reliability. When the number of votes are equal to or more than 100, it is determined that the votes are enough for the final determination of the reliability.

If the enough number of votes is obtained for the determination of the reliability, whether or not the reliability is equal to or more than the threshold at a step 404. Information file having the reliability under the reliability threshold 50, for example, is deleted (S405).

At a step S406, it is determined whether or not the processing on all of the information files has completed. When the total number of votes and the reliability are determined and there are enough numbers of votes for the reliability determination, information files having the reliability equal to or lower than the threshold are deleted. Then, the processing ends.

Figure 12:
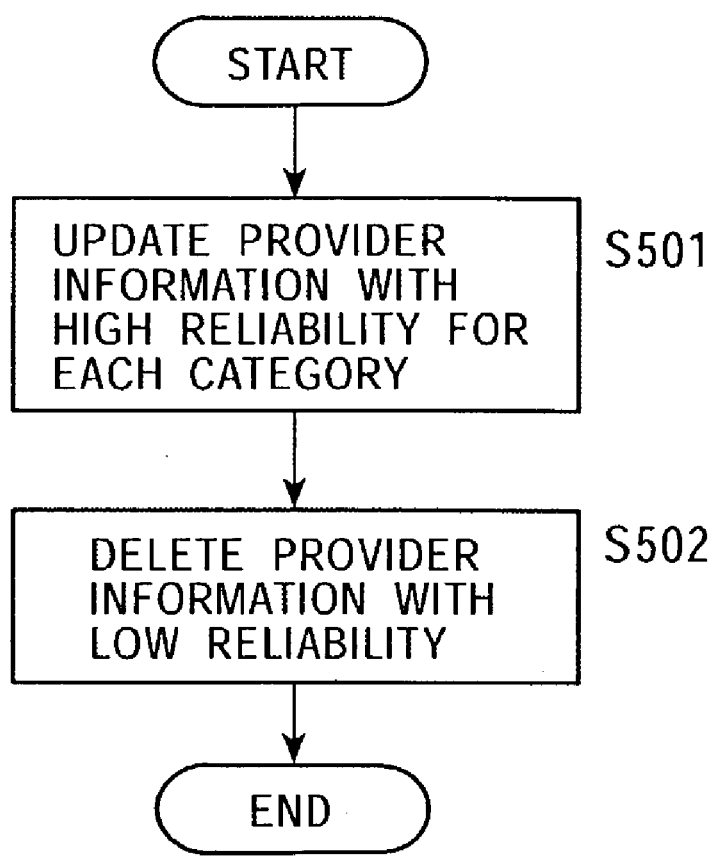
FIG. 12 is a flowchart for explaining database updating processing according to the present invention.

The processing for deleting information with low reliability and the processing for creating the highly reliable provider database (see FIG. 5) are performed in the system side periodically. As shown in FIG. 12, the information processor updates the highly-reliable provider database for each category described with reference to FIG. 5 by reflecting a new vote result thereon (S501). Also for the processing for deleting the information with low reliability, the processing for updating by reflecting a new vote result is performed (S502).

[Processing for Creating Highly-Reliable Provider Database]

Figure 13:
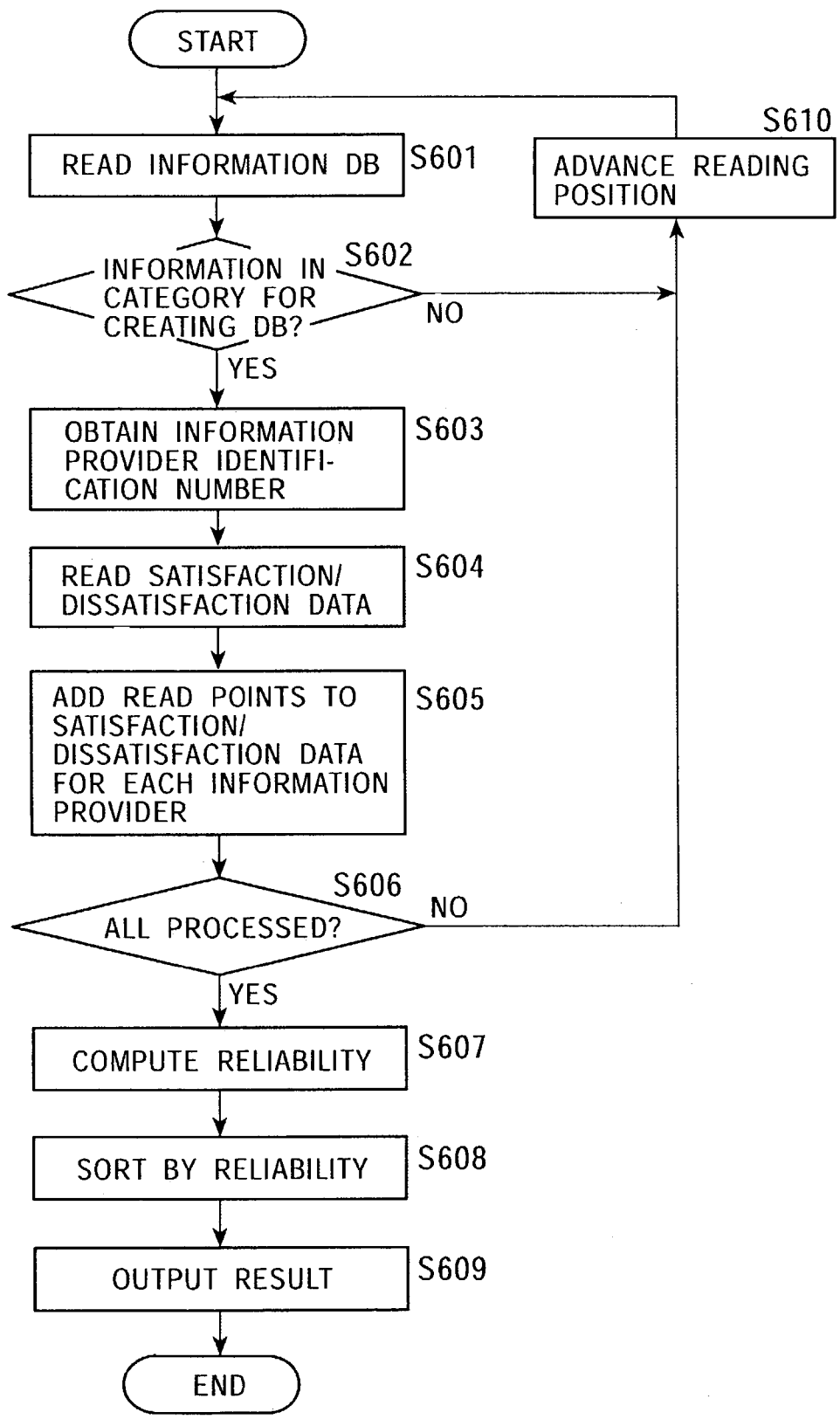
FIG. 13 is a diagram for explaining processing for creating and updating a highly-reliable provider database according to the present invention.
Figure 14:
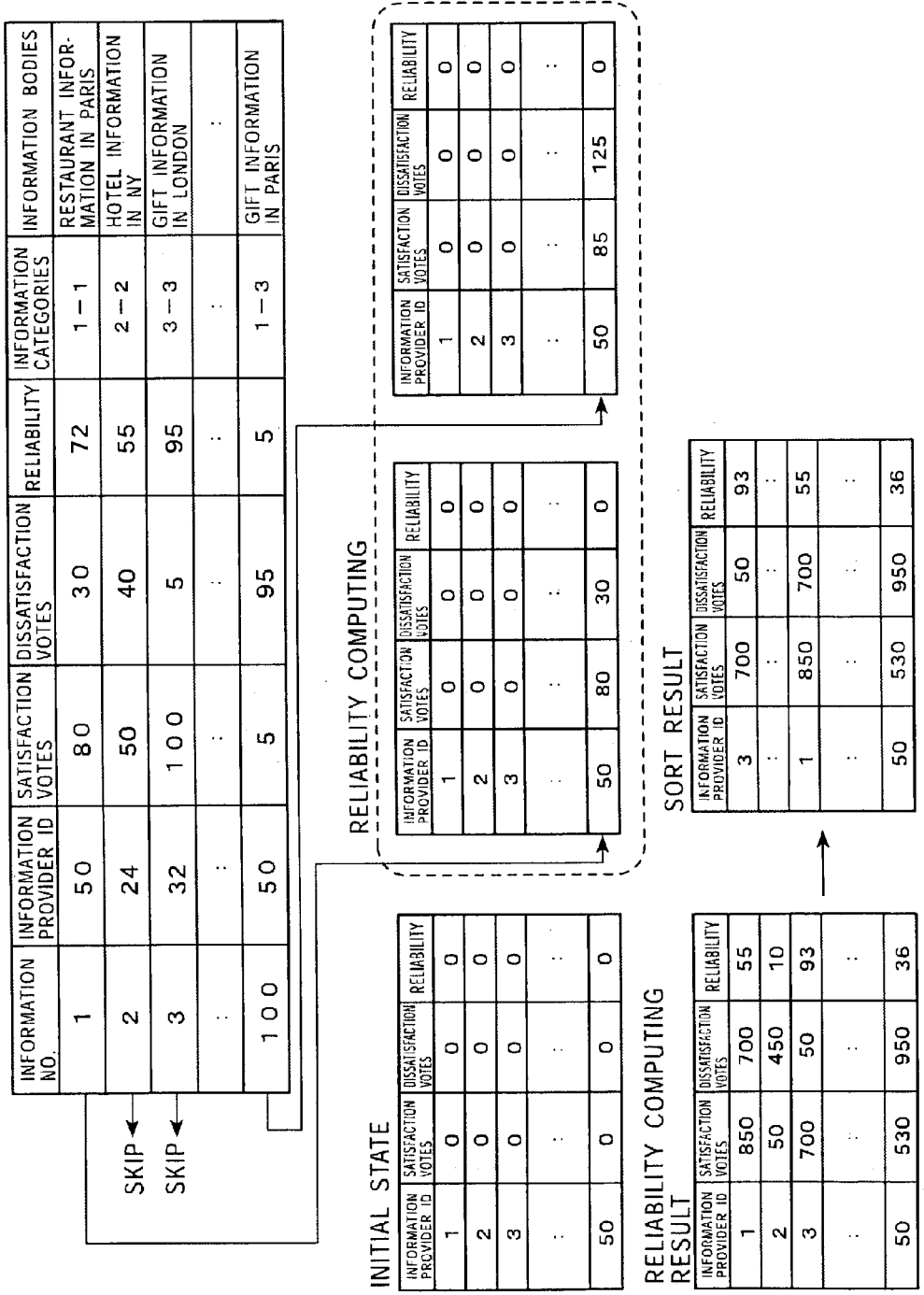
FIG. 14 is a diagram for explaining a processing example of the processing for creating and updating a highly-reliable provider database according to the present invention.

Next, the processing for creating the highly-reliable provider database described with reference to FIG. 5 above will be described with reference to a processing flow in FIG. 13 and a processing example in FIG. 14.

The highly-reliable-provider database is created based on information files in the provided information database 102 (see FIG. 2). Each of the steps of the flow in FIG. 13 will be described. First of all, at a step S601, information files of the provided information database will be read sequentially. For example, as shown in FIG. 14, the information files are read in order from Information NO. 1. Next, it is determined whether or not the category of the read information file matches with the category relating to the highly-reliable provider database. For example, in order to create the highly-reliable provider database for Paris information, data under a category [1-xx] (see FIG. 3) is only extracted. For example, as shown in FIG. 14, Information No. 1, which is read first, is data to be obtained. However, the categories of Information No. 2 and No. 3 are not [1-xx]. The information is different from Paris information. Therefore, they are not information to be obtained and are skipped.

At a step S603, an information provider identification number is obtained from the information file from which information is obtained. At a step S604, satisfaction/dissatisfaction data in the information file is obtained. At a step S605, the obtained satisfaction/dissatisfaction data is added sequentially. As shown in the middle of FIG. 14, data having an information provider identification ID [50] and the data for satisfaction votes and the dissatisfaction votes [80] and [30] are obtained from the information file of the information No. 1. From the information file of the information No. 100, data for the same information provider ID [50] is obtained and data for the satisfaction votes and the dissatisfaction votes [5] and [95] are obtained. As a result, the total satisfaction votes and total satisfaction votes for the information provider ID [50], [80+5=85] and [30+95=125] are obtained.

At a step S606, it is determined whether or not the processing on all of the information files in the provided information database has been completed. If not completed, at a step S610, the reading point is advanced where the processing on the next information file is similarly performed.

If the processing on all of the information files have been completed, at a step S607, the reliability is computed. The reliability computing is based on the equation, reliability=total satisfaction votes/(total satisfaction votes+total dissatisfaction votes). As shown in the lower left table of FIG. 14, the reliability is calculated for each of the information providers. Next, at a step S608, sort processing is performed based on the calculated reliability. Then, a list having the highly-reliable information providers aligned in order is created. The data is output, that is, the data is stored in the highly-reliable-provider database 106. Then, the processing ends. These kinds of processing are performed for each category. Highly-reliable-provider data is created for each category shown in FIG. 5.

[Question Site Model]

By using the above-described information processor, it is determined whether or not the information provider is reliable. Then, the highly-reliable-provider database is established for each information category. Next, a construction will be described for providing a highly reliable answer to a question from a user based on information stored in the highly-reliable-provider database.

Figure 15:
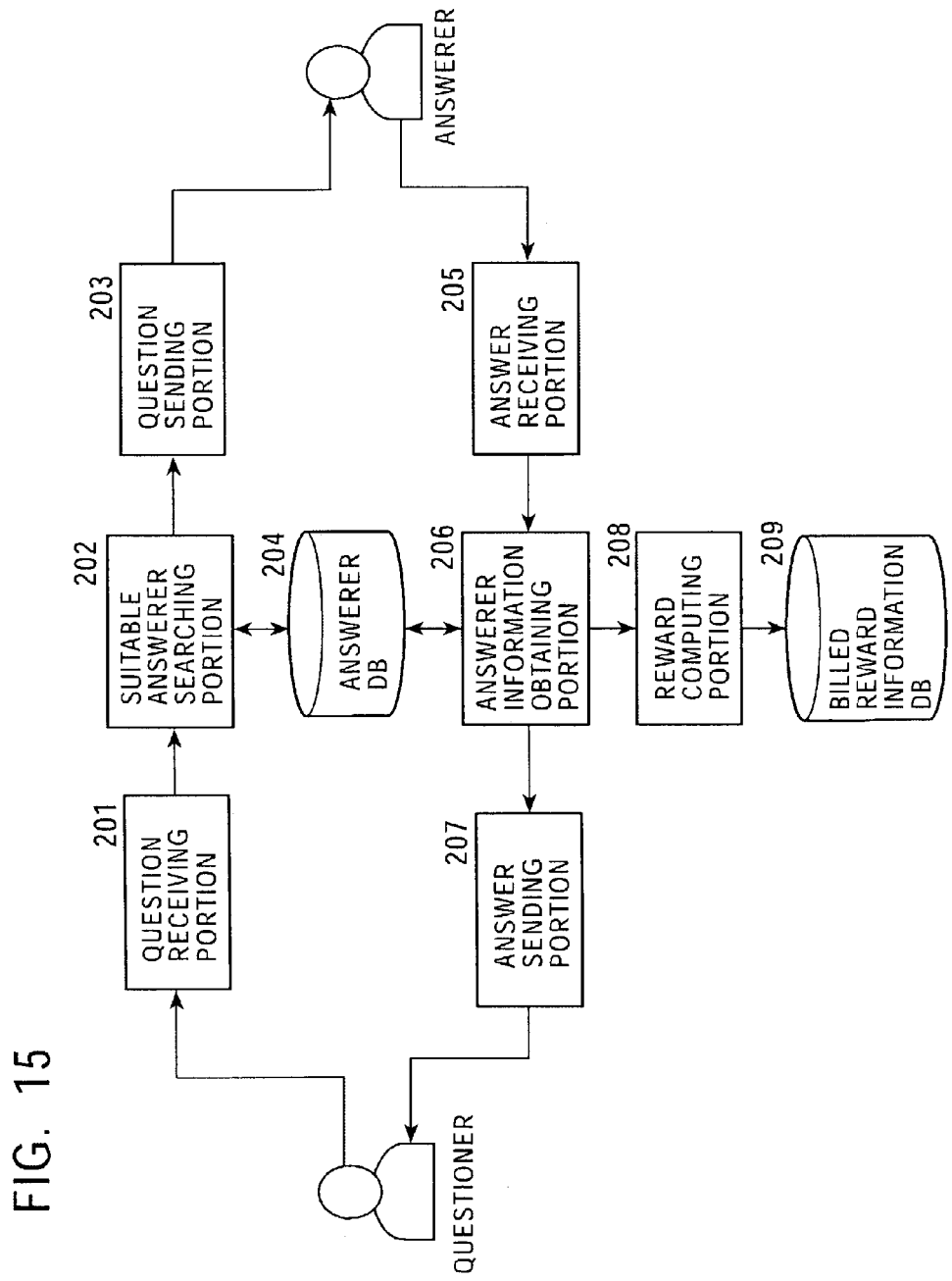
FIG. 15 is a block diagram for explaining a construction of a question processing site according to the present invention.

FIG. 15 shows a construction example of a question processing site for receiving a question from a questioner, transferring the question to an answerer, receiving an answer from the answerer and transferring the answer to the questioner. The question processing site may be constructed in parallel with the information processor shown in FIG. 1. Alternatively, the question processing site may be established as a separate system, which can communicate data with the information processor.

An outline of the question processing will be described with reference to a block diagram in FIG. 15. A questioner who sends a question and an answerer who provides an answer to the question are involved in the question processing system. They include promiscuous individuals, parties such as specific information providers and so on.

A question sent by a questioner is transferred to a suitable answerer searching portion 202 through a question receiving portion 201. In the suitable answerer searching portion 202, a suitable answerer in accordance with the question is searched from an answerer database 204. The answerer database 204 stores the same data as those in the highly-reliable-provider database described with reference to FIG. 5 and so on before, that is, data listing highly reliable providers for each category. In addition, the answerer database 204 stores the same data as those in the information provider database described with reference to FIG. 4. Address data of a highly-reliable provider can be extracted therefrom.

The suitable provider searching portion 202 obtains highly-reliable provider information from the answerer database 204 in accordance with a category of the question received through the question receiving portion 201. Then, the question is sent to a highly reliable provider extracted through a question sending portion 203.

The answerer sends an answer to the question. When the answer receiving portion 205 receives the answer, processing for checking the answerer is performed in an answerer information obtaining portion 206. Then, the question is transferred to the questioner through an answer sending portion 207. In addition, as reward for the answer is calculated in the reward computing portion 208 as required. The calculated reward information is stored in a charged reward information database 209.

Figure 16:
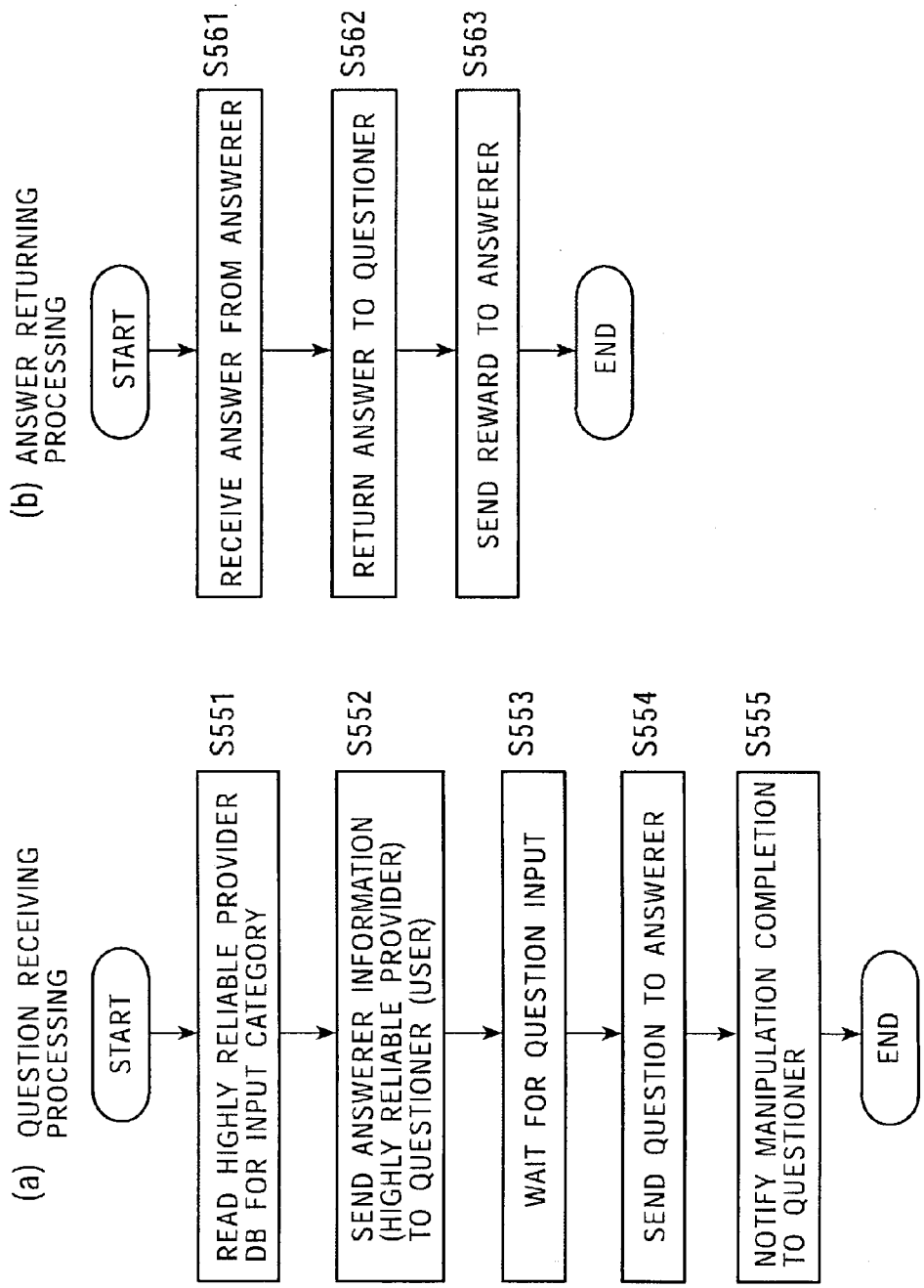
FIG. 16 is a diagram for explaining a question processing flow in the question processing site according to the present invention.

The question processing will be described with reference to a processing flow in FIG. 16. Here, the question processing will be described regarding question receiving processing (a) and answering processing (b). After receiving a question from a questioner, an answerer may be selected in accordance with the question. First of all, a site side for receiving a question obtains an answerer for a specific category from the answerer database 204. Then, the site side can broadcast the highly-reliable provider data to general users and receive a question regarding the specific category. Processing in FIG. 16 is the latter processing example.

In the question receiving processing (a), the question processing site obtains highly reliable provider information from the answerer database 204 in accordance with the category (S551). The question processing site sends or broadcasts the obtained answerer information to the questioner (S552)

The question processing site receives a question in a state for waiting a question input (S553). Then, the question is transferred to an answerer selected as a highly reliable provider (S554). Then, a notification of the operation completion is sent to the questioner (S555), and the processing ends.

In the answering processing (b), first of all, a replay (an answer) is received (S561) in a state for waiting a reply from an answerer, and the answer is transferred to the questioner (S562). In addition, a result of calculation of a reward to the answerer is sent to the questioner (S563), and the processing ends.

The reward to the answerer may be paid to the answerer in accordance to the answering processing for the question from certain charges, which have been collected from the users using the system in advance. Alternatively, a charge may be collected for each question from a questioner.

[Construction of Processing for Collecting Charges for Information Use]

Next, a construction will be described in which highly-reliable provider data stored in the highly-reliable-provider database is provided to a user, and a charge is collected therefor.

Figure 17:
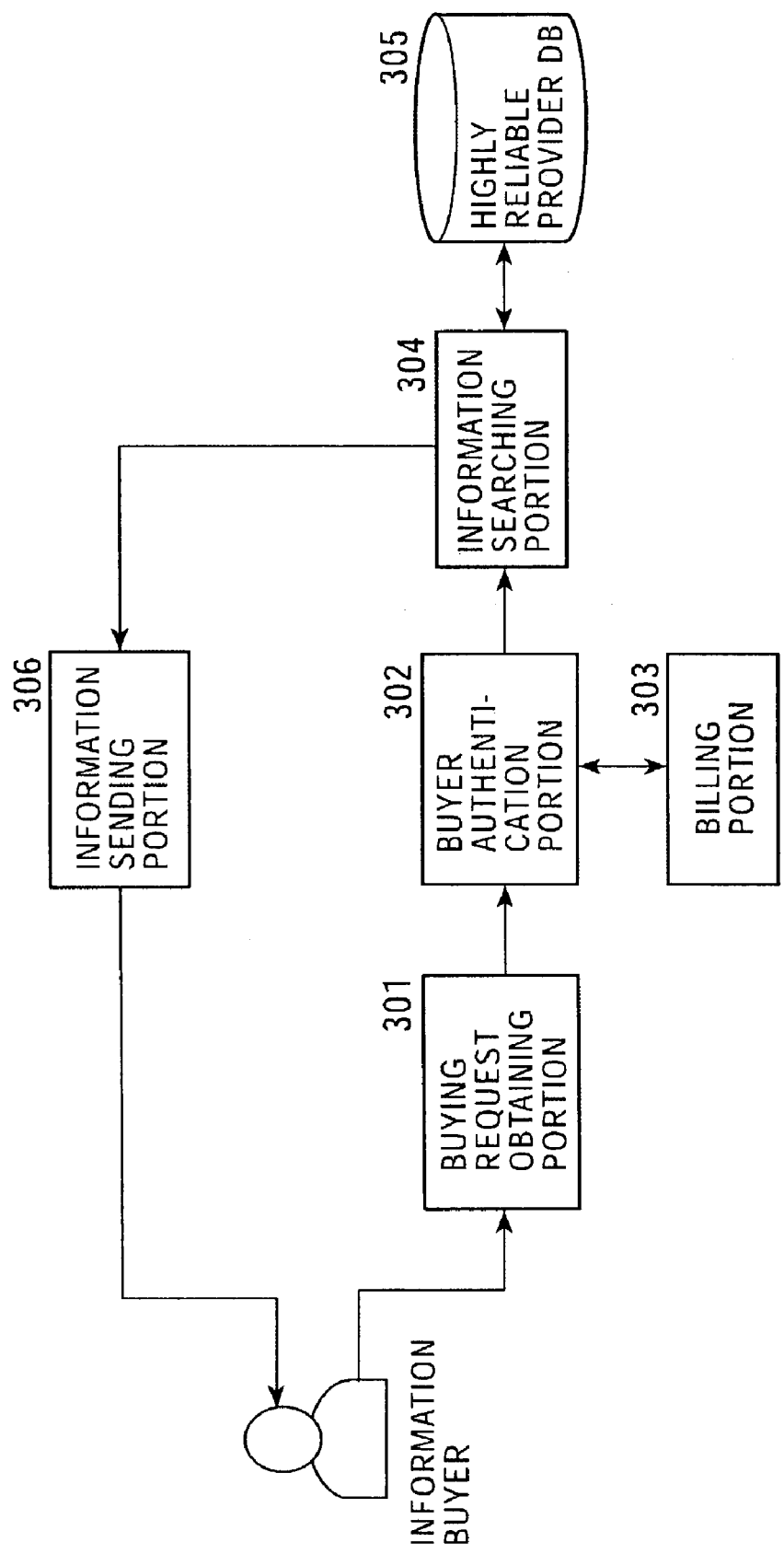
FIG. 17 is a block diagram for explaining a construction of information purchase processing according to the present invention.

FIG. 17 shows a construction example of a processing site for receiving a request from an information buyer and providing highly-reliable-provider data stored in the highly-reliable-provider database. The processing site may be established in parallel with the information processor shown in FIG. 1. Alternatively, the processing site may be a separate system, which can communicate data with the information processor.

An outline of information buying processing will be described with reference to a block diagram in FIG. 17. The information buying processing system involves an information buyer who buys information and a promiscuous individual, a party such as a specific information provider or the like.

A request for buying information sent by an information buyer is transferred to a buyer authentication portion 302 through a buying request obtaining portion 301. In the buyer authentication portion 302, an information requester is authenticated in accordance with an authentication sequence established in the system, such as a public key authentication. The information requester is authenticated based on registered user data of a billing portion 303. As a requirement of the authentication, billing is performed in the billing portion 303 specifically such as automatically payment from the requestor's bank account by using his/her credit card number.

In an information searching portion 304, highly-reliable-provider data is extracted from a highly-reliable-provider database 305 in accordance with a specified category included in the information buying request from the information buyer. Then, the highly-reliable provider data is sent to the information buyer through an information sending portion 306.

Figure 18:
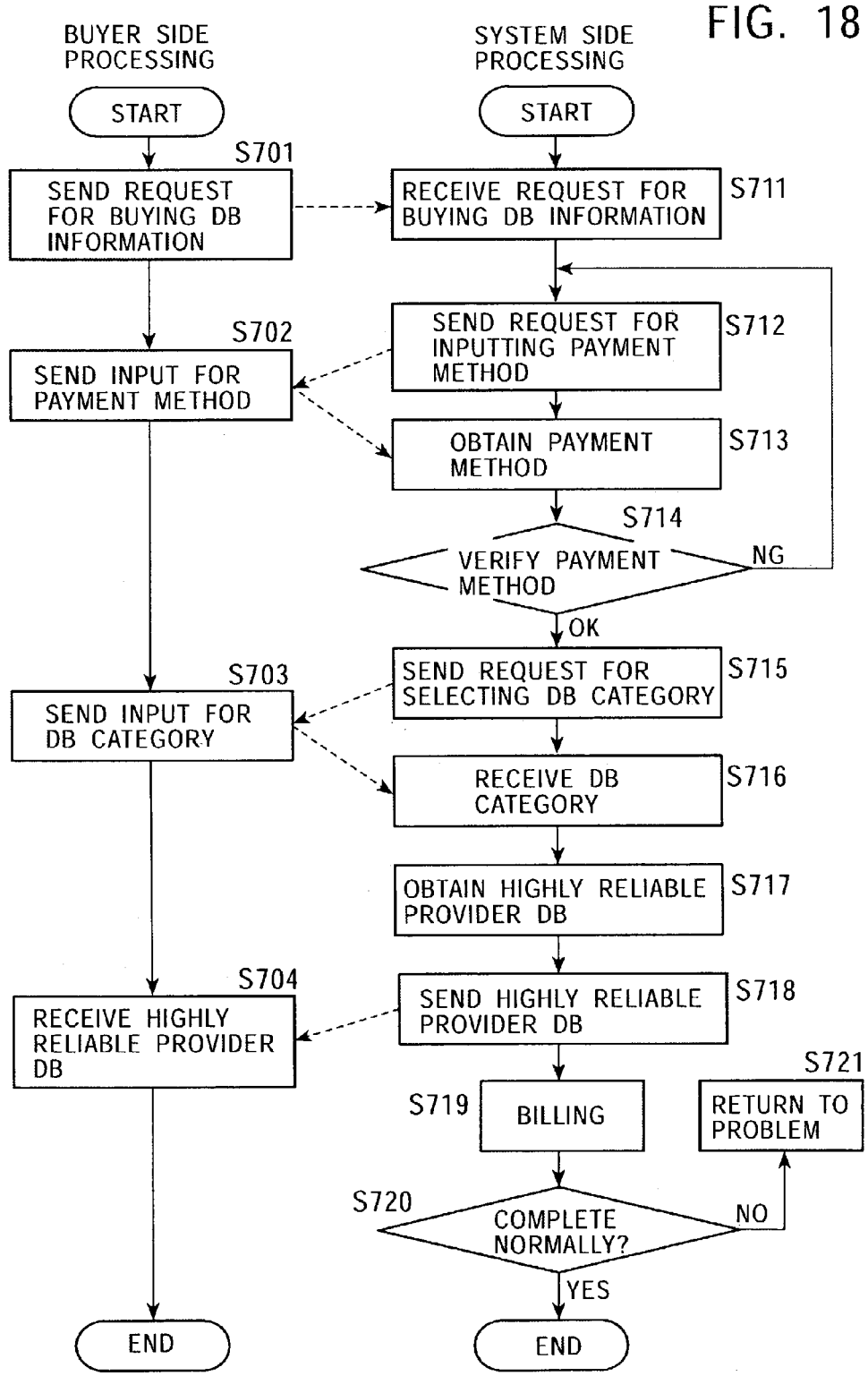
FIG. 18 is a diagram for explaining an information purchase processing flow according to the present invention.

A series of processing involved in the information buying processing will be described with reference to a flow in FIG. 18. The left side of FIG. 18 shows processing by an information buyer while the right side shows processing in the system side.

First of all, at a step S701, a buyer sends a request for buying highly-reliable provider data to the system. The system receives the request for buying the highly-reliable-provider data from the information buyer at a step S711. At a step S712, the system side sends a request for inputting a payment method to the information buyer. At a step S702, the information buyer inputs and sends the payment method. At a step S713, the system side receives the payment method and verifies the payment method at a step S714. If the payment is admitted as possible, the processing goes to the next step. If the payment method is NG, the information buyer is prompted to input a payment method again.

If the verification of the payment method is OK, at a step S715, the system side sends a request for selecting a database category to the information buyer. Then, the information buyer inputs and sends the database category. At a step S716, the system side receives the database category.

Next, at a step S717, the system side searches the highly-reliable-provider database based on the database category received from the information buyer and obtains highly-reliable provider data under the corresponding category. At a step S718, the system side sends the obtained highly-reliable-provider data to the information buyer. The information buyer receives the highly-reliable-provider data at a step S704.

Furthermore, at a step S719, the system side performs billing processing in accordance with the payment method verified before. At a step S720, it is determined whether the billing has completed normally or not. If the billing has completed normally, the processing ends. If there is a problem, the processing returns to the problem (S721).

[Construction Example 2 of Information Processor]

In the above-described construction example 1 of the information processor, the processing construction is adapted for calculating the reliability of information by using the evaluation of the user, that is, of the information user. Next, a construction example of the information processor will be described having a construction example for calculating the reliability based on actual result information of provided information. The result is actually indicated as a fact, such as stock purchase information and purchased betting ticket for horse racing.

[System Outline]

Figure 19:
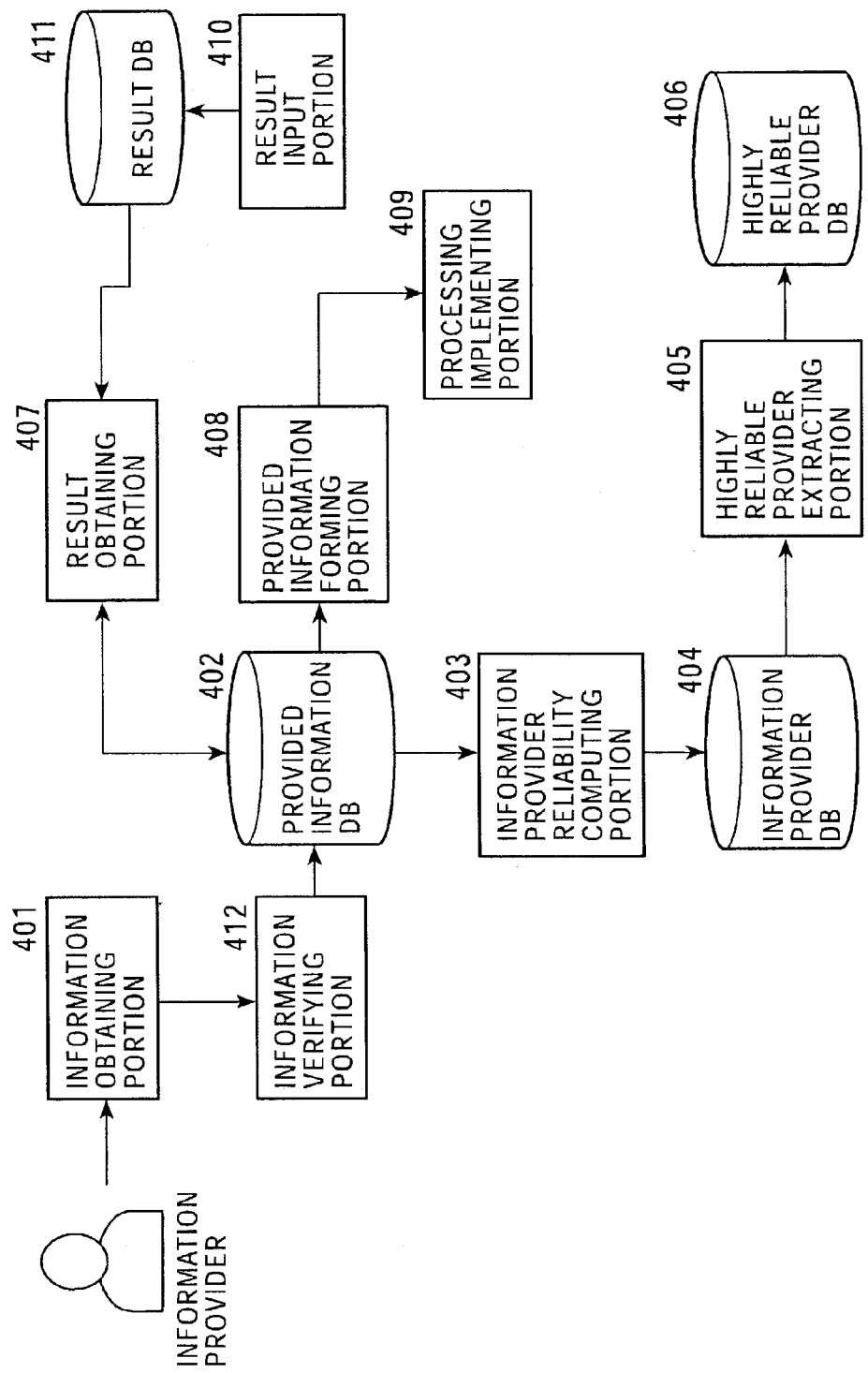
FIG. 19 is a block diagram showing a system configuration example (example 2) of the present invention.

FIG. 19 is a block diagram showing an information processor according to this example. An outline of processing performed by a system according to this example will be described with reference to the block diagram in FIG. 19. In the information processor in this example, the evaluation for an information provider who provides information is performed based on an actually obtained result unlike the one in the above-described example. The information providers may be a stock fund manager who provides combination information of purchased stocks, an information provider for a betting ticket, an information provider of investment estimation data relating to a venture business and the like. The information providers include promiscuous individuals, professionals and parties such as information providing companies.

Information provided by an information provider is obtained through an information obtaining portion 401 of the information processor and is verified in an information verifying portion 412. The information provider sends information through a communication terminal such as a PC and a mobile telephone owned by the information provider. The provided information is received by the information obtaining portion 401 having a communication interface and is stored in an information database (DB) 402.

The information stored in the information database (DB) 402 is formed in a provided information forming portion 408 and is executed in an information executing portion 409. For example, if provided information is information including combination data of stocks, the combination data of stocks is extracted from the provided information, and the information executing portion 409 implements processing for purchasing combination of extracted stocks. If the provided information is information including betting ticket purchase data. The betting ticket purchase data is extracted from the provided information in the provided information forming portion 408. Then, the information executing portion 409 implements processing for purchasing the betting ticket based on the extracted betting ticket purchase data. The stock purchase processing, betting ticket purchase processing and so on are implemented by using the actual online transaction. However, in order to evaluate an information provider, actual transaction and purchase are not performed, but only the data within a database may be updated and be stored as if those kinds of processing are implemented virtually.

A result database 411 stores result data corresponding to actually performed processing through a result input portion 410. For example, if the provided information is stock combination data, price fluctuation information of the stocks is stored. If the provided information is betting-ticket purchase data, a race result is stored.

The data stored in the result database 411 is obtained by the result obtaining portion 407. The result obtaining portion 407 stores obtained result data in corresponding data in the provided information database 402.

Figure 20:
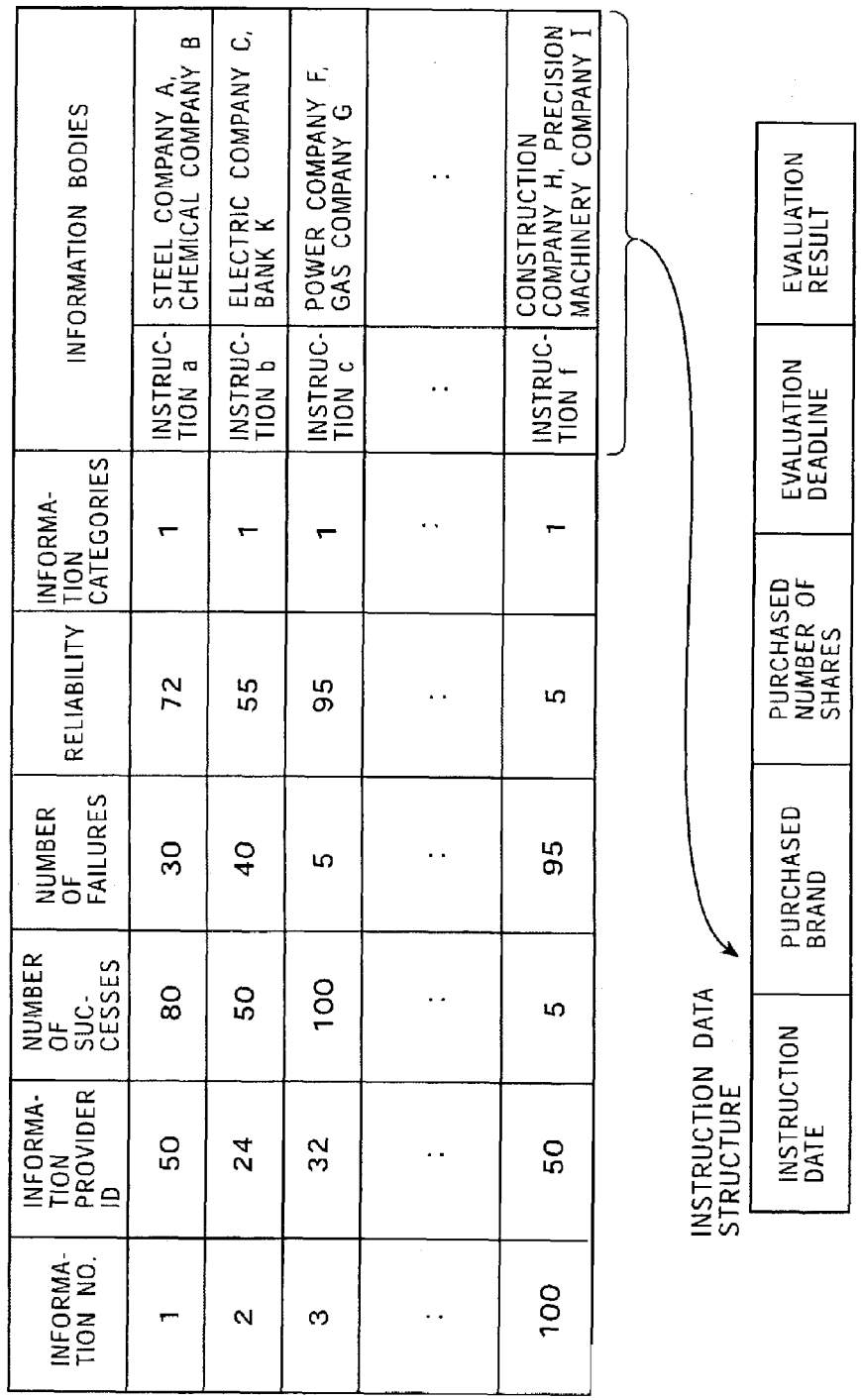
FIG. 20 is a diagram for explaining a data construction example of a provided information database according to the present invention (example 2).

A structure example of data to be stored in the information database (DB) 402 will be described with reference to FIG. 20. Information provided by an information provider is provided with an information number as an identifier. Each information stores an information provider identifier for identifying an information provider, numbers of successes and failures based on result data, reliability calculated from numbers of successes and failures. The reliability is calculated by the equation, reliability=a number of successes/(a number of successes+a number of failures), for example.

In addition, a category of provided information and an information body are stored by associating with each other. The category is set as, for example, stock fund purchase processing=1 here.

Figure 21:
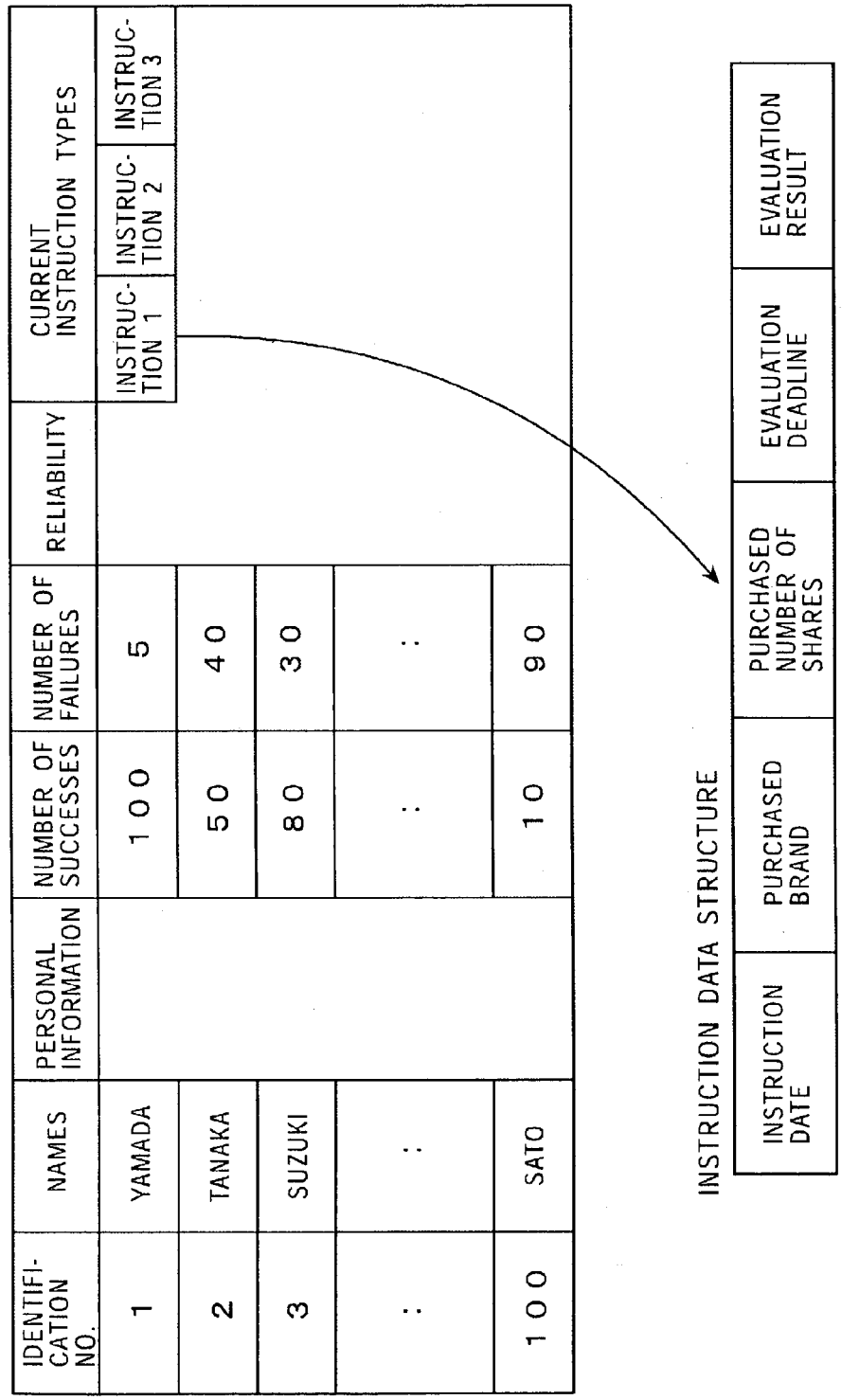
FIG. 21 is a diagram for explaining a data construction example of an information provider database according to the present invention (example 2).

The information processor according to the present invention creates an information provider database 404 for accumulating information relating to an information provider based on data stored in the information database (DB) 402. The structure example of data stored in the information provider database 404 is shown in FIG. 21. The information provider database 404 stores names, personal information, a number of successes, a number of failures and reliability of each information provider by corresponding to an information provider identifier for identifying a given information provider. If one person provides one pieces of information, a value for the reliability calculated by the equation, reliability=a number of successes/(a number of successes+a number of failures), like the reliability stored in the information database (DB), in the information provider database 404. If one person provides many pieces of information, the reliability data is stored for each information category. In an information provider reliability computing portion 403, an average value of a plurality of reliability may be calculated and be stored as the reliability of the information provider.

In addition, a current instruction type is stored in the data stored in the information provider database 404. An example shown in FIG. 21 is a stock fund purchase example and includes an instruction date, a purchased brand, a purchased number of shares, an evaluation deadline and an evaluation result. The evaluation deadline is data set as an evaluation date for checking occurrence of a profit or a loss by calculating a money amount of stocks in accordance with a given instruction. As the evaluation result, for example, a money amount of a profit or a loss, and a profitability or a loss rate are stored.

In the information processor shown in FIG. 19, based on information provider data stored in the information provider database 404, a highly-reliable-provider extracting portion 405 extracts highly reliable providers and stores a list of extracted highly reliable provider is stored in a highly-reliable-provider database 406.

A structure example of data stored in the highly-reliable-provider database 106 is shown in FIG. 22. An example shown in FIG. 22 is an example having a data structure in which reliability of information providers are aligned in order from the higher reliability. As shown in FIG. 22, stock fund information providers are listed in order from information providers having higher rates of successes, that is, with higher reliability. A detail of each processing using this system will be described with reference to drawings.

[Database Updating Processing]

Processing performed in accordance with information from an information provider and updating a number of successes, a number of failures and reliability and updating highly-reliable-provider data are implemented. The data updating processing will be described.

Figure 23:
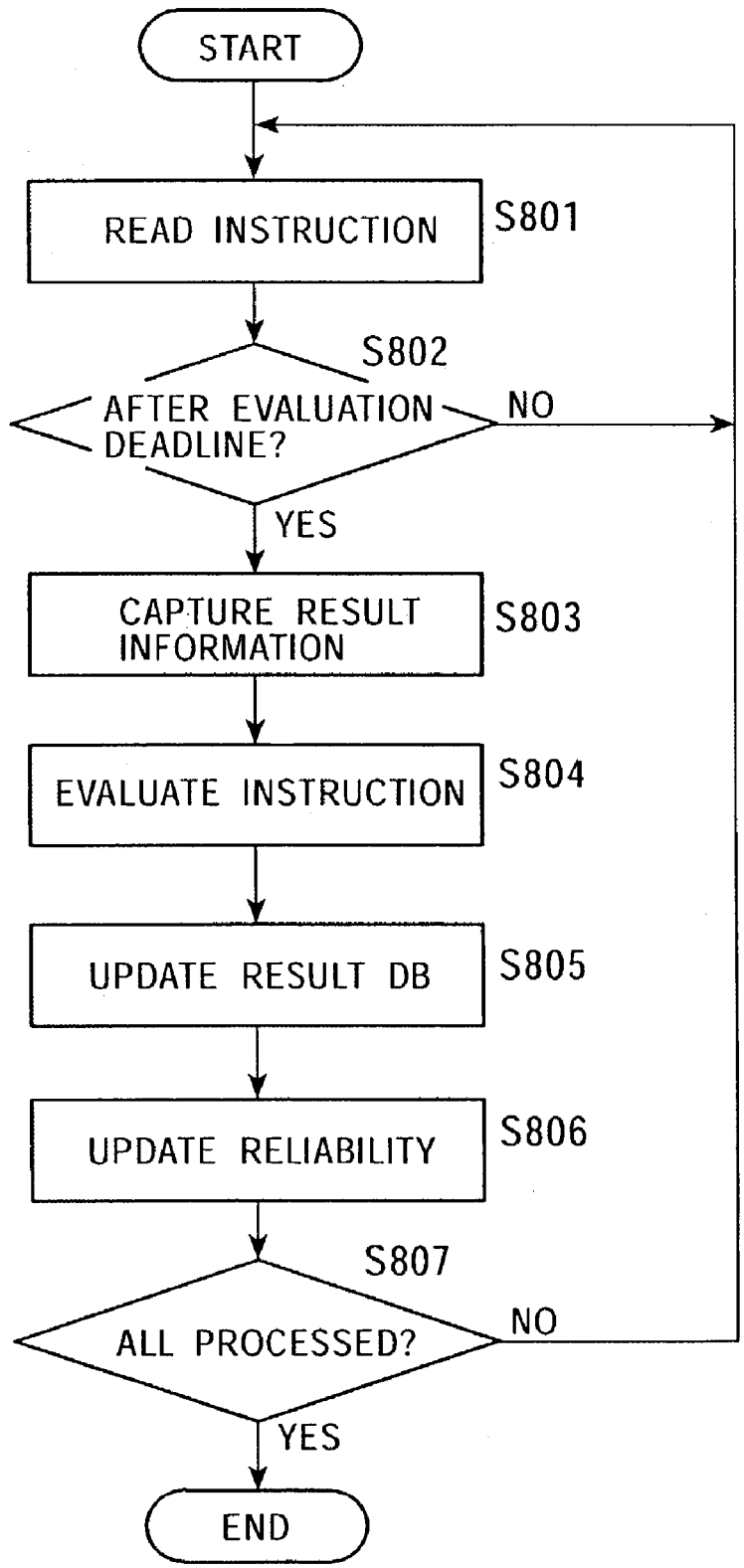
FIG. 23 is a flowchart for explaining database updating processing in information evaluation processing according to the present invention.

FIG. 23 shows a processing flow of the data updating processing. The data updating processing is implemented periodically. First of all, at a step S801, an information file of the provided information database 402 is opened and stored data is obtained therefrom. Then, instruction data in the file is obtained. At a step S802, the evaluation deadline of the obtained instruction data is checked to determine whether or not the evaluation deadline has been passed. If the evaluation deadline has been passed, the processing goes to the next step. If the evaluation deadline has not been passed, instruction data of the next information file is obtained.

At a step S803, result information is captured from the result database 411. That is, instruction data is a stock fund for one billion yen. If an instruction is given for purchasing 500 thousand yen of the fund of a steel company A and 500 thousand yen of the fund for a chemical company B, the result data at the evaluation deadline is obtained.

At a step S804, evaluation processing is implemented based on the obtained result data. If the price at the evaluation deadline is higher than the one at the instructed date, the result is successful. If the price is lower than the one at the instructed date, the result is unsuccessful. For simple description, the evaluation is performed based on which price is higher between those at the instructed date and the deadline simply here. However, points in accordance with an increase rate and a decrease rate may be set as evaluation points. In this case, the reliability is set based on the evaluation points.

At a step S805, the database is updated. This processing includes updating the number of successes, the number of failures and the number of reliability in the provided information database (see FIG. 20), updating the number of successes, the number of failures and the reliability in the information provider database (see FIG. 21), and updating the highly-reliable-provider database (see FIG. 22).

Figure 24:
FIG. 24 is a diagram for explaining a database updating processing example of the information evaluation processing according to the present invention.

FIG. 24 shows an example of processing for updating the number of successes, the number of failures and the reliability in an information provider database. The information provider database includes instruction data for each information provider. Result data is obtained as shown in the upper right of FIG. 24. For example, a deadline for [Instruction 1] has been passed for a fund manager with Identification Number 1. The price of the set fund is increased, and the result, "succeed", is obtained. Then, the number of successes is updated as [100→101]. A deadline for [Instruction xx] has been passed for a fund manager with Identification Number 2. The price of the set fund is decreased as a result, and the result, "failed", is obtained. Then, the number of failures is updated as [40→41]. With the data updates, reliability:reliability=a number of successes/(a number of successes+a number of failures) is calculated. Then, the reliability data is updated.

At a step S806, whether or not the processing on all of the information files has been completed is determined. The deadline of each of the information files is determined. Then, a number of successes, a number of failures and reliability of the information files having passed the deadlines are updated, and the processing ends.

[Processing Involved in Input of New Instruction]

Next, processing for storing a new instruction, for example, an instruction for purchasing a new fund will be described with reference to FIG. 25.

An information processor in this example is waiting for an input of information during a time of receiving data basically. When information from an information provider is input (S901), an inputting person is identified at a step S902. The information provider is requested to input an ID for identifying the inputting person. The ID is compared with personal information data registered in the information provider database to identify the inputting person.

Next, at a step S903, input information is verified. The verifying processing includes checking that all of required items are input in a predetermined format, for example. In addition, the verifying processing includes checking data falsification by using MAC verifying processing as necessary, for example, when confidential data is included.

In the data verification, if required data is not input, or if illegal data falsification is determined, the processing goes to a step S907. There, a notification for abnormal ending is sent and the processing ends. In the data verification, if no problems are found, an instruction is input to databases (the provided information database and the information provider database). Then, the database updating processing is performed at a step S904. At a step S905, whether or not the processing is performed properly and whether or not the database updating processing has completed are verified. If the processing does not end properly, a notification of abnormal ending is sent. If the processing ends properly, a notification of ending is sent.

FIG. 26 shows an example of data updating processing performed on the information provider database when a new instruction is input. This example is processing performed when the fund manager with Identification Number 1 requests a new instruction input. A new instruction type is added to a [Current Instruction Types] in the information file of the fund manager with Identification Number 1. The new instruction type includes an instruction date, a purchased brand, a purchased number of stocks, an evaluation deadline and an evaluation result in a case of an instruction for purchasing stock funds, for example.

Figure 25:
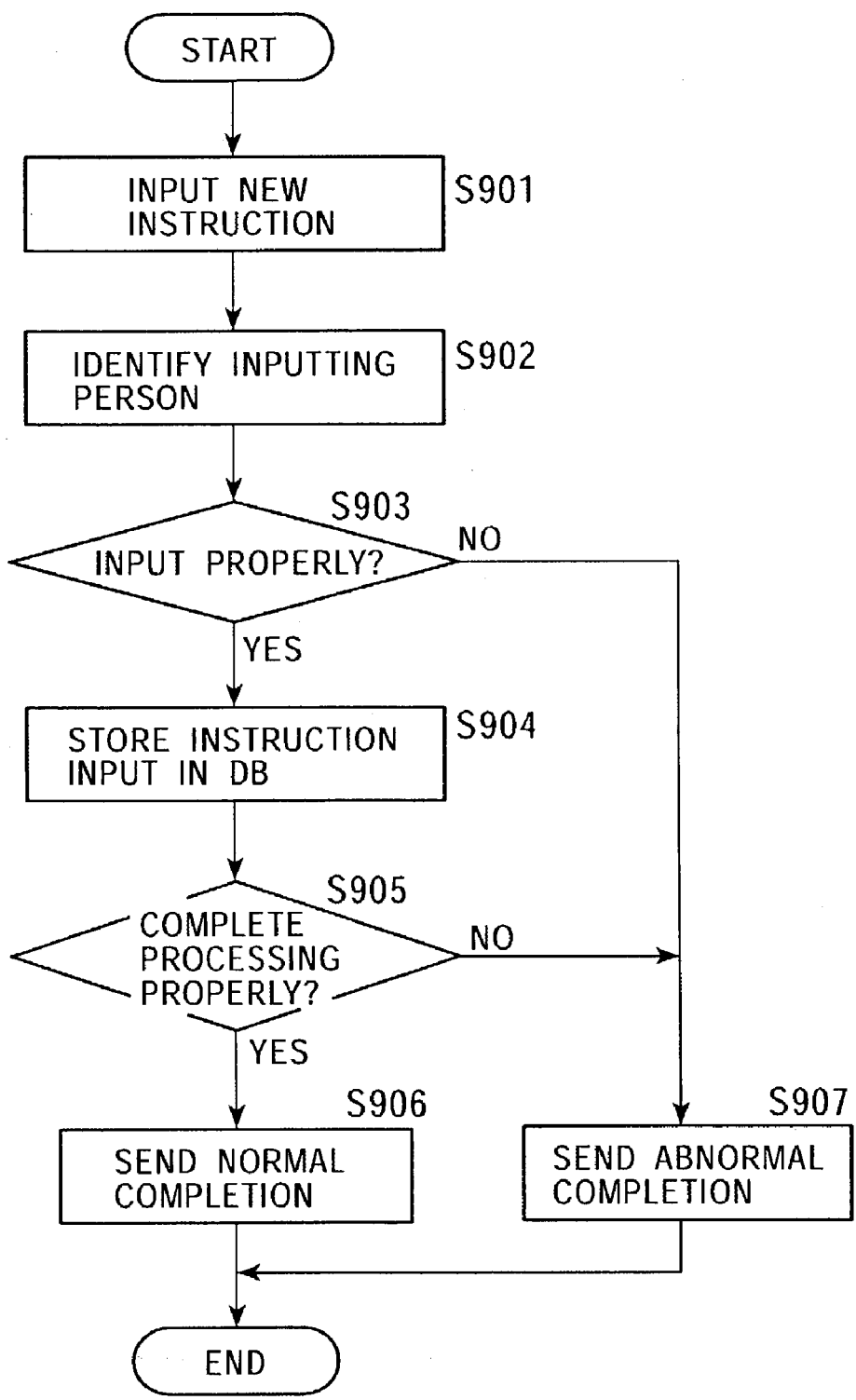
FIG. 25 is a flowchart for explaining database updating processing in information input processing according to the present invention.
Figure 27:
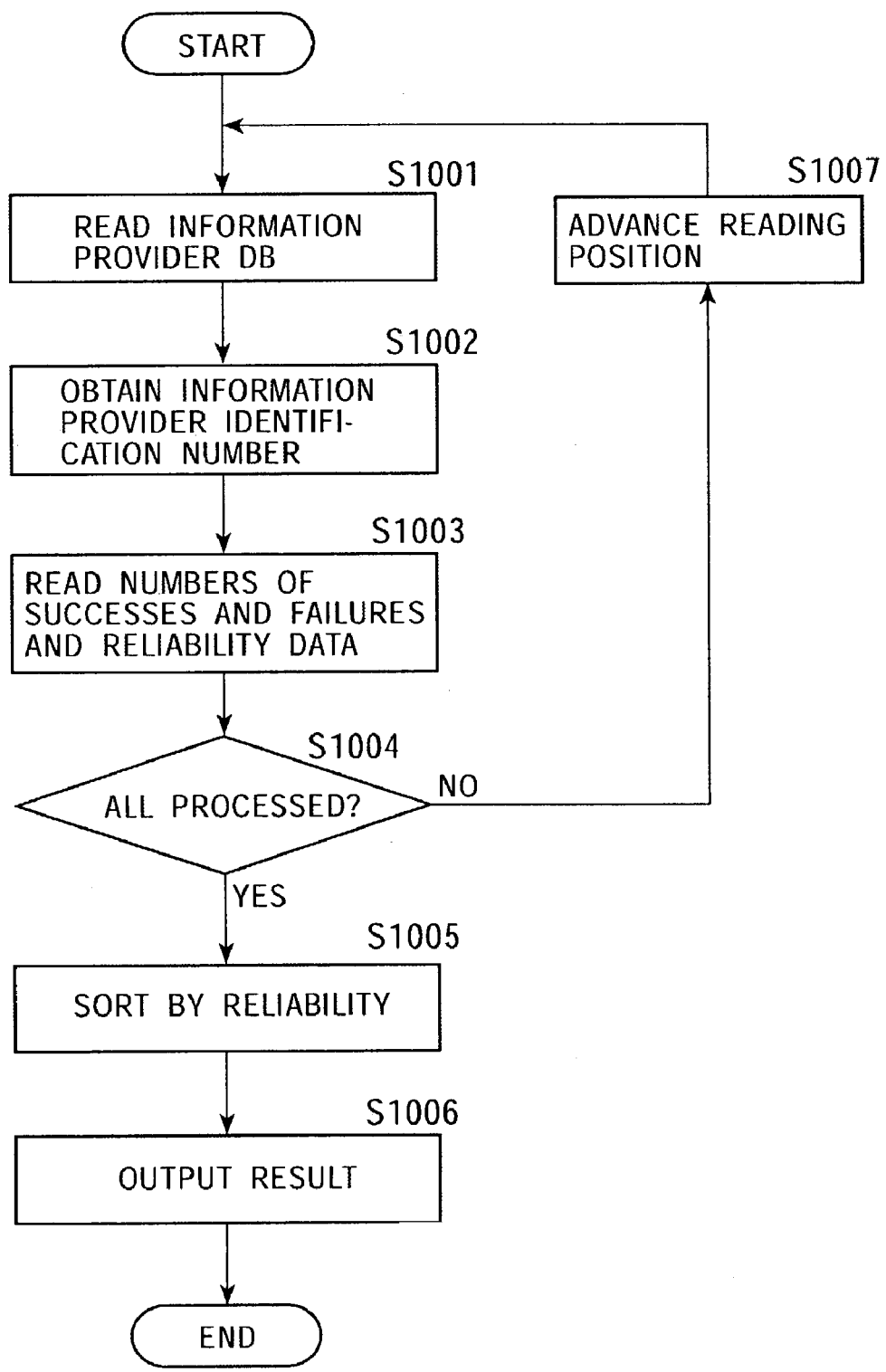
FIG. 27 is a diagram for explaining processing for creating and updating highly-reliable provider database according to the present invention.

As the database updating processing in FIG. 25, the highly-reliable-provider database may be updated together. However, the highly-reliable-provider database may be updated independently from updating the other databases. FIG. 27 shows a flowchart for explaining processing for creating and updating a highly-reliable provider database.

A highly-reliable provider database is created and is updated based on each information file in the information provider database (see FIG. 21). Steps of the flow in FIG. 27 will be described. First of all, at a step S1001, information files in the information provider database are read sequentially. Next, at a step S1002, information provider identification numbers in the information files from which information is obtained are obtained. At a step S1003, a number of successes, a number of failures and reliability data in each of the information files are obtained.

At a step S1004, whether all of the information files in the information provider database are processed or not is determined. If not all of the information files have been processed, a reading position is advanced at a step S10610. Then, the next information file is processed similarly.

If the processing on all of the information file has completed, at a step S1005, the information files are sorted based on the reliability is performed. A list is created in which information providers are aligned in order from those with highly reliability. For example, the list is shown in FIG. 22. Through these kinds of processing, highly-reliable data is created.

[Using Information Stored in Database]

As described above, with the construction according to this example, highly-reliable-provider data is created based on real accomplishments. Higher number of successes can be obtained by, for example, purchasing stocks or purchasing a betting ticket based on information provided by such a highly reliable provider. The examples of using databases will be described below.

Figure 28:
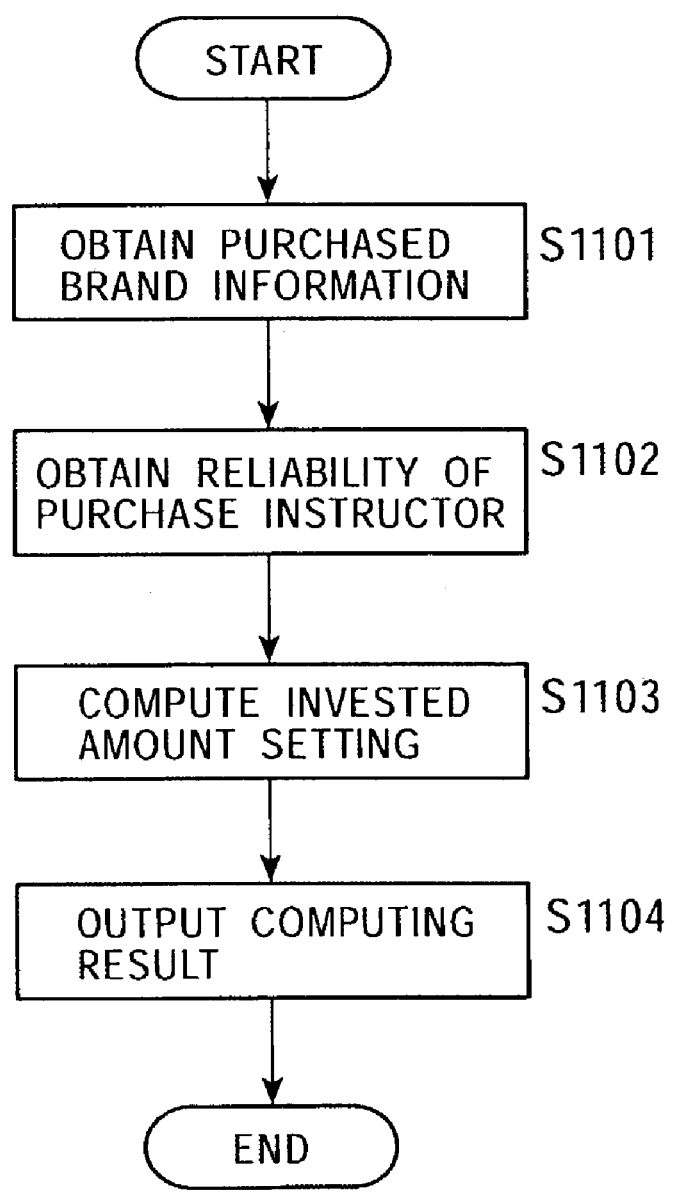
FIG. 28 is a flowchart for explaining an example of using database-storing data according to the present invention.

By following a flow shown in FIG. 28, an example of using information stored in a database will be described. The processing flow in FIG. 28 is a flow showing a processing example for setting a stock to be purchased based on data stored in the highly-reliable-provider database. In this case, a user attempts to purchase stocks of companies A, B and C. In this example, the purchasing proportions are set based on the highly-reliable-provider database.

First of all, at a step S1101, the system receives an information obtaining request having to-be-purchased brand information from the user. At a step S1102, reliability data of an information provider is obtained from the highly-reliable-provider data included in the to-be-purchased brand information. For example, highly-reliable-provider data as shown in FIG. 29(a) can be obtained.

Next, an amount to be invested is set based on the weight for each instructor, which is included in the highly-reliable-provider database. An example of the processing for setting an amount to be invested is shown in FIG. 29(b). Here, the top three information providers (for example, fund managers) with higher reliability included in the highly-reliable-provider database are selected who give instructions having been stored in the database and including an instruction for purchasing stocks of the companies A, B and C.

Next, at a step S1102, computation for setting an amount to be invested is performed. The reliability calculated based on the numbers of successes ad the numbers of failures of these three people is 90, 50 and 20. The proportion instructed for purchasing the companies A, B and C included in the instruction of each of the fund managers is [company A: 50 and company B: 50] by fund manager Yamada, [company A: 30, company B: 10 and company C: 60] by fund manager Tanaka, and [company A: 30, company B: 40 and company C: 30] by fund manager Suzuki.

The computation for setting an amount to be invested here is:

A:B:C=6600:5800:3600 based on:

Company A: 50*90+30*50+30*20=6600;

Company B:50*90+10*50+40*20=5800; and

Company C:00*90+60*50+30*20=3600

For example, if an amount to be invested is one million yen, the one million yen is divided in accordance with the dividing proportion. 410 thousand yen to the company A, 360 thousand yen to the company B and 230 thousand yen to the company C are set. The information is provided to the user (S1104).

As described above, with the construction of this example, provided information provided by the information provider is evaluated based on an actual processing result. Highly-reliable providers having provided information with higher evaluation are listed. The information provided by highly-reliable providers can be weighted. Thus, processing for investment with higher degrees of successes can be implemented.

[Data Communication Terminal Apparatus]

Next, a construction example of a data communication terminal apparatus connected to the above-described information processor will be described for using processing information of the information processor.

Figure 30:
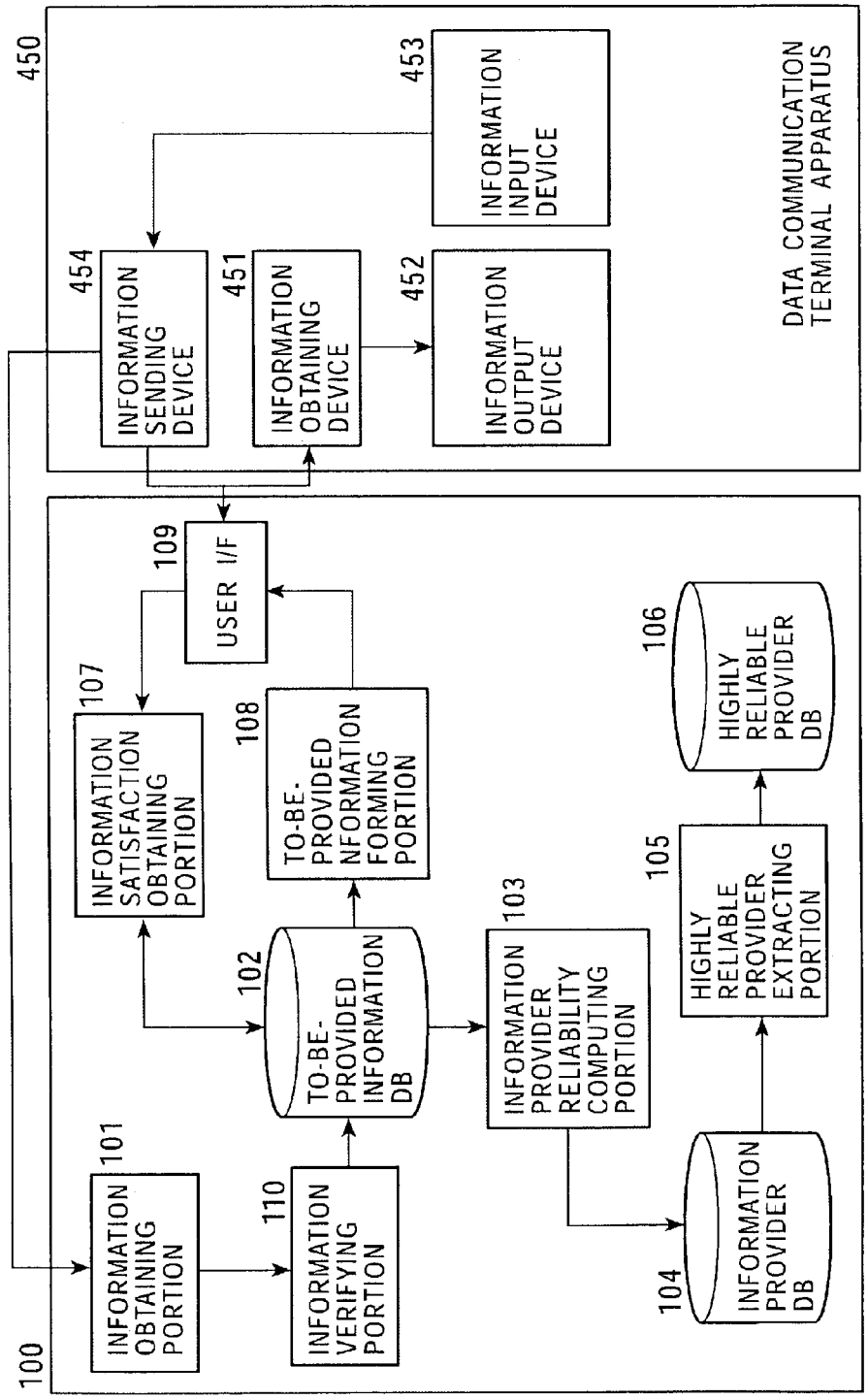
FIG. 30 is a diagram for showing a construction example of a data communication terminal apparatus according to the present invention.

FIG. 30 shows a construction example of a communication terminal apparatus. A data communication terminal apparatus 450 is connected such that data exchanges through a user interface 109 of an information processor 100 or information transmission to an information obtaining portion 101 can be performed. The information processor 100 shown in FIG. 3 has the same construction as the one described with reference to FIG. 1. The description will be omitted here.

The data communication terminal apparatus 450 includes an information obtaining device 451 for receiving data through the user interface 109 of the information processor 100, an information output device 452 including a display and a speaker for outputting information obtained by the information obtaining device 451, an information inputting device 453 including a keyboard, a switch, a touch panel and a mouse, and an information sending device 454 for sending data input from the information input device 543 to the user interface 109 of the information processor 100 or to the information obtaining portion 101.

Figure 31:
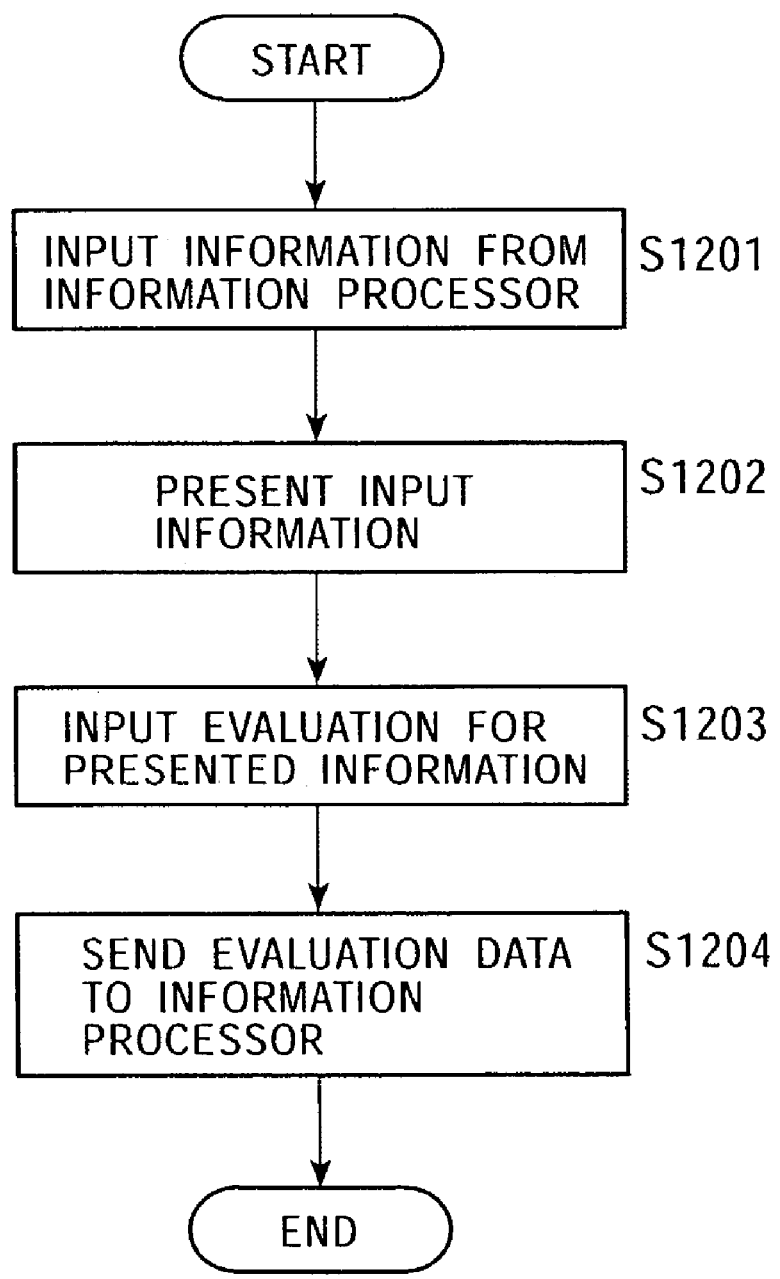
FIG. 31 is a flowchart showing processing of the data communication terminal apparatus according to the present invention.
Figure 32:
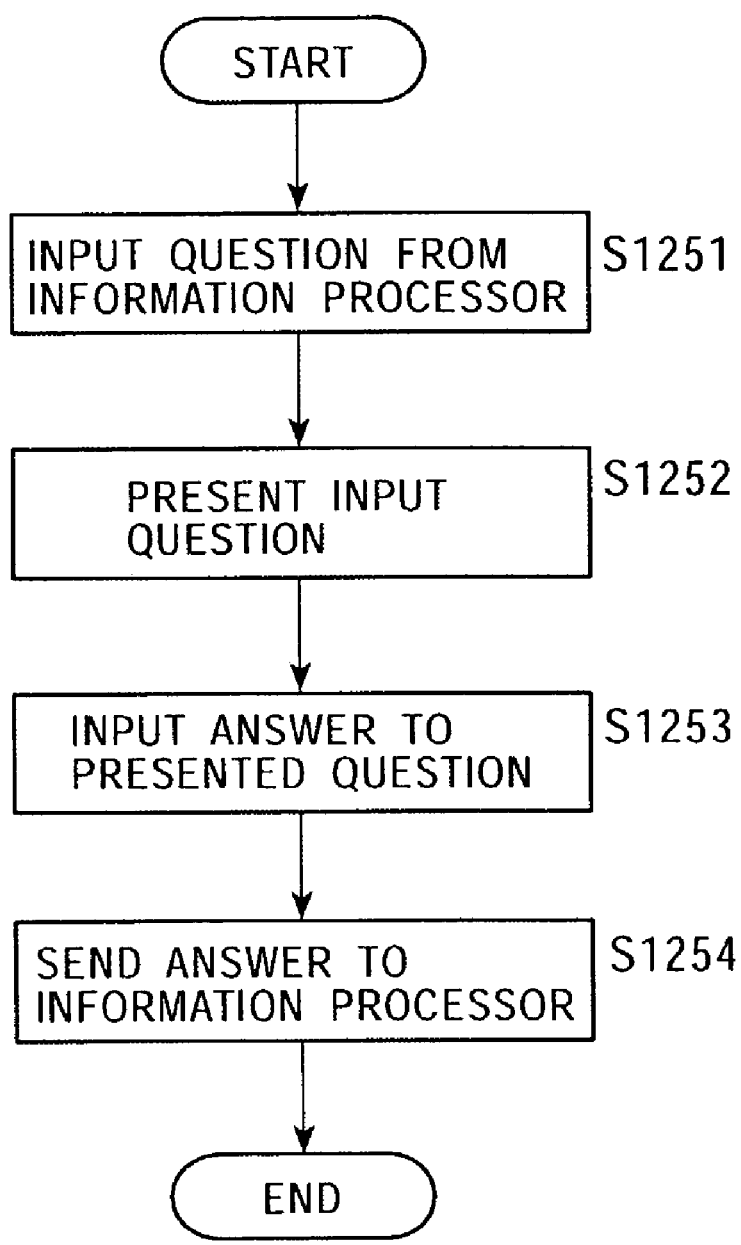
FIG. 32 is a flowchart showing processing of the data communication terminal apparatus according to the present invention.
Figure 33:
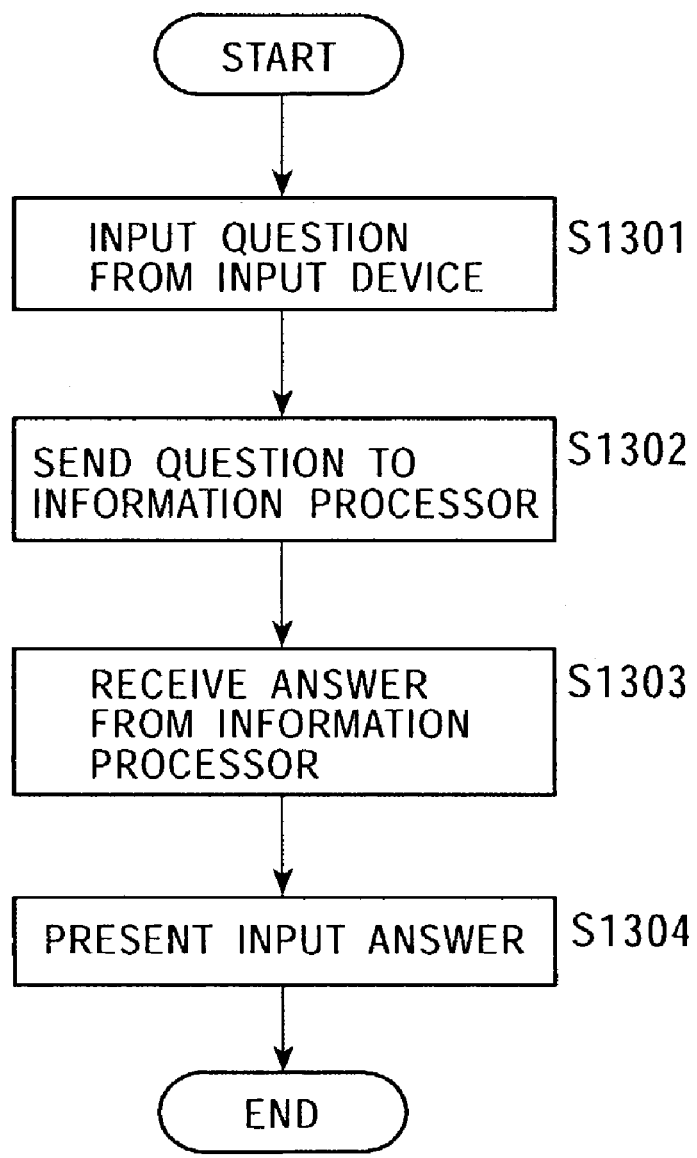
FIG. 33 is a flowchart showing processing of the data communication terminal apparatus according to the present invention.

A processing example of the data communication terminal apparatus 450 will be described with reference to flows in FIGS. 31 to 33. First of all, information is obtained from the information processor 100. The content of the information is disclosed to an evaluator for evaluating the obtained information to prompt the evaluator to input the evaluation of the information. Then, the input is sent to the information obtaining device as evaluation data. This processing will be described with reference to the flow shown in FIG. 31.

First of all, at a step S1201, the information obtaining device 451 of the data communication terminal apparatus 450 obtains information from the information processor 100. At a step S1202, the information output device 452, which is a device for disclosing information, present the obtained information to an evaluator for evaluating the obtained information.

At a step S1203, the information presented to the information output device 452 is input an evaluation through the information input device 453. The evaluation is data to be reflected as satisfaction data or accomplishment data. At a step S1204, the information sending device 454 sends the satisfaction data or the accomplishment data, which is evaluation data, to the information obtaining apparatus 100.

The information processor 100 can collect and store evaluation data, that is, satisfaction data or accomplishment data fast from a number of data communication terminal apparatus with the above-described processing.

In addition, a question to a highly-reliable information source from another user may be sent from the information processor 100 to the data communication terminal apparatus 450. Then, an answer may be obtained from the data communication terminal apparatus 450. Processing steps of this processing example will be described with reference to the processing flow in FIG. 32.

First of all, at a step S1251, the information obtaining device 451, which is a question receiving device of the data communication terminal apparatus 450, obtains, from the information processor 100, a question to a highly reliable information source from another user. At a step S1252, the information output device 452, which is a question presenting device, presents the obtained question.

At a step S1253, an answerer inputs, through the information input device 453, an answer to the question presented by the information output device 452. At a step S1254, the information sending device 454, which is an answer sending device, sends an answer input by using the input device 453 to the information obtaining device 100.

The information processor 100 can collect and store answers from a number of data communication terminal apparatus and can answer to questioners fast.

Furthermore, according to one processing example, a user sends a question from the data communication terminal apparatus 450 to the information obtaining device 101 of the information processor 100. Then, the answer from the information processor 100 is obtained by using the communication terminal apparatus 450. This processing example will be described with reference to the flow shown in FIG. 33.

First of all, at a step S1301, a user inputs a question through the information input device 453 of the data communication terminal apparatus 450. At a step S1302, the information sending device 454, which is the information sending device, sends the question input by the input device 453 to the information obtaining device 101 of the information obtaining apparatus 100.

The information processor 100 sends an answer obtained from the other communication terminal apparatus, for example, to the data communication terminal apparatus 450. The information obtaining device 451 of the data communication terminal apparatus 450 obtains the answer from the information processor 100 at a step S1303. At a step S1304, the information output device 452, which is an answer presenting device, performs processing for presenting the obtained answer.

The information processor 100 can collect and store answers from a number of data communication terminal apparatus and can answer to a questioner fast.

[System Configuration]

Figure 34:
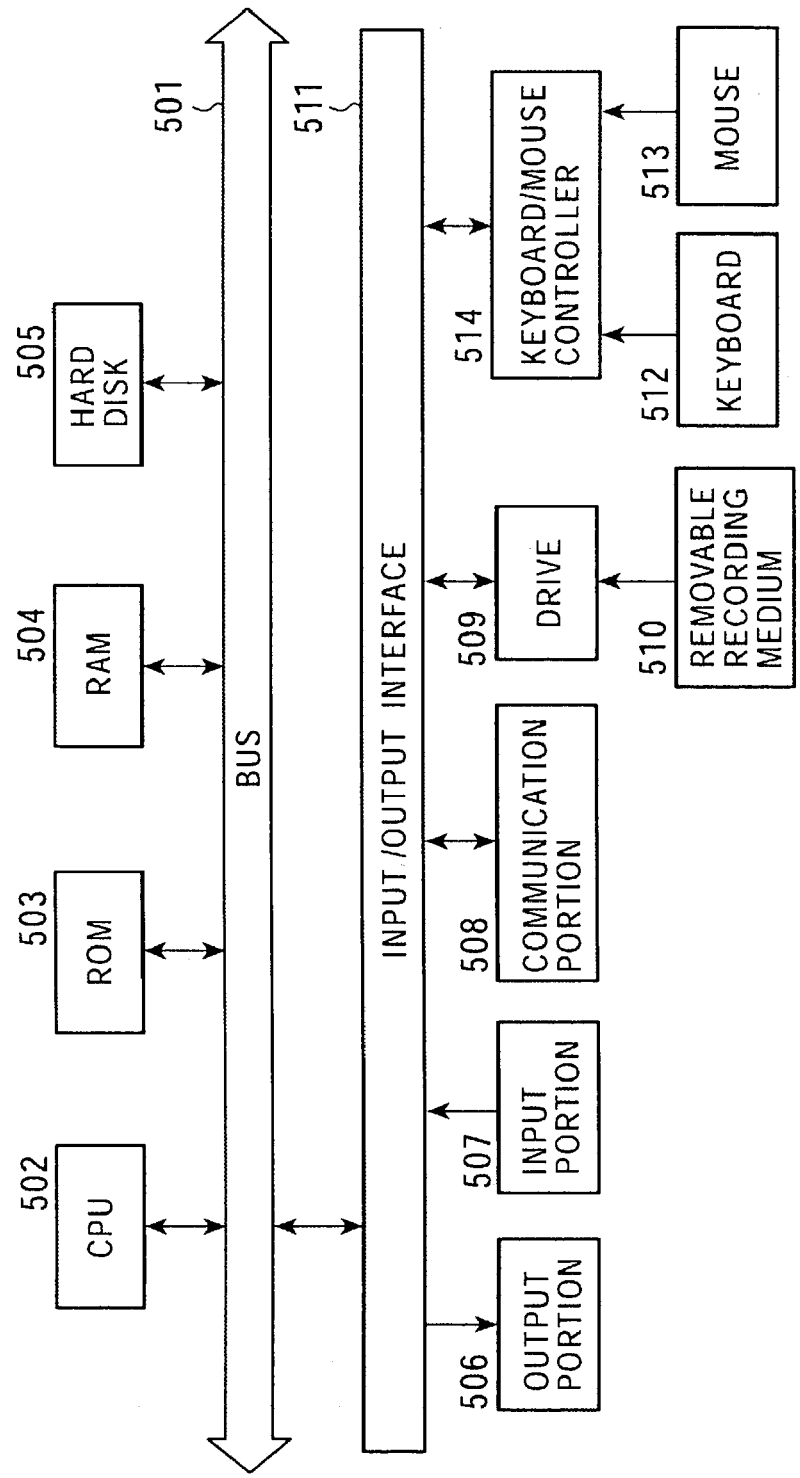
FIG. 34 is a diagram showing a system configuration example for implementing processing of the present invention.

A series of the processing described in the above-described examples in the information processor and the data communication terminal apparatus according to the present invention can be performed by hardware, software or a configuration combining both of them. When the processing is performed by software, a program recording processing sequences may be installed and be executed in a memory within a data processor built in specific hardware. Alternatively, the program may be installed and be executed in a generic computer, which can execute different kinds of processing. When the series of processing is performed by software, programs included in the software may be installed in a generic computer, one-chip microcomputer or the like. FIG. 34 shows a system configuration example of an information processor and a data communication terminal apparatus for executing the above-described different kinds of processing.

The system has a CPU (central processing unit) 502. The CPU (central processing unit) 502 actually executes different kinds of application programs and an OS (operating system). A ROM (read-only-memory) 503 stores a program executed by the CPU 502 or fixed data as a computing parameter. A RAM (random access memory) 504 is used as a storing area and a work area for a program to be executed in the processing by the CPU 502 and parameters, which vary as necessary in program processing. The CPU 502, the ROM 503, the RAM 504 and a hard disk 505 are connected to a bus 501 and can transfer data to each other. In addition, they can transfer data to different kinds of input/output devices connected to an input/output interface 511.

A keyboard 512 and/or a mouse 513 are manipulated by a user to input different kinds of instructions, such as to input a command input data, through a keyboard/mouse controller 514.

A drive 509 is a drive for writing/reading a removable recording medium 510, such as a floppy disk, a CD-ROM (compact disk read only memory), an MO (Magneto optical) disk, a DVD (digital versatile disc), a magnetic disk and a semiconductor memory. The drive 509 reads a program or data from each removable recording medium 510 and stores a program or data into the removable recording medium 510.

When an instruction is input by using the keyboard 512 and/or the mouse 513 through the input/output interface 510. The CPU 502 executes a program stored in the ROM (read only memory) 503 in accordance with the input.

The CPU 502 not only can execute a program stored in the ROM but also can load and execute in the RAM (random access memory) 504 a program stored in the hard disk 505, a program transferred through a satellite or a network, received by a communication portion 508 and installed in the hard disk 505, or a program read from the removable recording medium 510 mounted to the drive 509 and installed to the hard disk 505.

In the system having the configuration shown in FIG. 34, the CPU 502 performs processing according to each of the above-described examples or processing according to the above-described block diagrams and flowcharts. The CPU 502 sends the processing result from the communication portion 508. In addition, as necessary, the processing result is output to a display apparatus such as an LCD (liquid crystal display) and a CRT through the input/output interface 511 and the output portion 506. Furthermore, processing for storing into a recording medium such as the hard disk 505 can be performed.

Programs for executing different kinds of processing can be recorded in the hard disk 505 and/or the ROM 503, which are recording media built in the system, in advance. Alternatively, the programs may be stored (recorded) temporarily or permanently in the removable recording medium 510 such as a floppy disk, a CD-ROM (compact disk read only memory), an MO (Magneto optical) disk, a DVD (digital versatile disc), a magnetic disk and a semiconductor memory. The removable recording medium 510 may be provided as so-called package software.

Each of the programs may be installed from the removable recording medium 510 as described above to a computer. In addition, the program may be transferred to a computer from a download site to a computer through an artificial satellite for digital satellite broadcasting or may be transferred to a computer through a network such as a LAN (local area network) and the Internet. The computer receives the program transferred in this way by using the communication portion 508 and can install the program into the self-containing hard disk 505.

Here, the processing steps for writing the programs for causing a computer to perform the different kinds of processing herein do not have to be performed in time series in accordance with the order described in the flowcharts. The processing steps may be performed in parallel or independently.

The programs may be executed by one computer or may be distributed and be executed by multiple computers. Furthermore, the programs may be transferred to and be executed by a remote computer.

The present invention has been described above in detail with reference to the specific examples. However, apparently, those skilled in the art can modify or replace the examples without departing from the principle of the present invention. In other words, the present invention has been disclosed illustratively and should not be interpreted in a limited manner. The principle of the present invention should be determined with reference to claims written in the beginning.

The different kinds of processing described herein may be not only executed in time series as described herein but also be executed in parallel or individually in accordance with processing capability of a device for executing the processing or as required. The "system" herein is a construction logically gathering multiple devices. The devices in each construction are not always in the same cabinet.

INDUSTRIAL APPLICABILITY

According to the present invention, as apparent from the description above, information from various information providers is stored. In addition, the reliability of the information is calculated by inputting an evaluation based on a result of use of the provided information or an actual processing result based on the provided information. The reliability of a provider of each information is calculated for each category and a highly-reliable-provider database is established. With this construction, an information user (buyer) can extract highly reliable providers from the highly reliable provider database and can use or buy information provided by the extracted providers. Thus, highly reliable information can be selected from many pieces of information.

The invention claimed is:

1. An information processor for storing information provided from different kinds of information sources in a database and for executing processing on stored information, comprising:
a provided information database storing information provided from the information sources corresponding to data for identifying information providing sources;
evaluation data obtaining means for obtaining evaluation data for the information stored in the provided information database;
reliability computing means for computing reliability of the provided information based on the evaluation data, and updating provided information database by deleting the information having a reliability below a threshold;
highly-reliable-information-source extracting means for extracting one or more highly-reliable information sources from the information providing sources of the information stored in the updated provided information database based on the reliability data calculated by the reliability computing means, computing values of reliability for extracted highly-reliable information sources, and sorting the extracted highly-reliable information sources based on the computed values; and
data transmitting means for transmitting data from or concerning the one or more highly-reliable information sources extracted by the highly-reliable information source extracting means to at least one user.

2. An information processor according to claim 1, wherein the evaluation data obtaining means is arranged to obtain satisfaction data, which is obtained as a result of disclosure of the information stored in the provided information database.

3. An information processor according to claim 2, wherein the reliability computing means is arranged to calculate a value of reliability by computing based on satisfaction data obtained as a result of disclosing information stored in the provided information database by implementing reliability being equal to a number of satisfaction votes/(a number of satisfaction votes plus a number of dissatisfaction votes).

4. An information processor according to claim 3, wherein the reliability computing means is arranged to stop processing for calculating the value of the reliability when the value of (a number of satisfaction votes+a number of dissatisfaction votes) is less than a predetermined threshold.

5. An information processor according to claim 2, wherein the reliability computing means is arranged to calculate a value of reliability by performing computing based on accomplishment data obtained as a processing result based on information stored in the provided information database, that is, by implementing reliability=a number of successes votes/(a number of successes votes+a number of failures votes).

6. An information processor according to claim 5, wherein the reliability computing means is arranged to stop processing for calculating the value of the reliability when the value of (a number of successes votes+a number of failures votes) is less than a predetermined threshold.

7. An information processor according to claim 1, wherein the evaluation obtaining means is arranged to obtain accomplishment data obtained as a processing result based on information stored in the provided information database.

8. An information processor according to claim 1, further comprising a highly-reliable-information-source database storing highly reliable information source data extracted by the highly reliable information source extracting means.

9. An information processor according to claim 1, wherein the information processor is arranged to newly calculate reliability data in the reliability computing means based on evaluation data newly obtained by the evaluation data obtaining means and to perform data update by storing the calculated reliability data in the provided information database.

10. An information processor according to claim 1, wherein the information processor is arranged to compare reliability of information stored in the provided information database and a predetermined threshold and to delete the information if the reliability is lower than the threshold.

11. An information processor according to claim 1, wherein the highly-reliable-information-source extracting means is arranged to perform processing for calculating reliability of each information provider based on reliability data added to information from a same information providing source from information stored in the provided information database.

12. An information processor according to claim 11, wherein the highly-reliable-information-source extracting means is further arranged to perform processing for listing reliability of each of the information providers in order of reliability.

13. An information processor according to claim 11, wherein the highly-reliable-information-source extracting means is arranged to perform processing for calculating an average of a plurality of the reliability data as the reliability of each of the information provider.

14. An information processor according to claim 1, wherein the highly-reliable-information-source extracting means is arranged to extract information belonging to a same category from information stored in the provided information database and to calculate reliabiity of each information provider for each category based on reliability data added to information from a same information providing source.

15. An information processor according to claim 14, wherein the highly-reliable-information-source extracting means is further arranged to perform processing for listing reliability of each of the information providers in order of reliability.

16. An information processor according to claim 14, wherein the highly-reliable-information-source extracting means is arranged to perform processing for calculating an average of a plurality of the reliability data as the reliability of each of the information provider.

17. An information processor according to claim 1, wherein the information processor is arranged to perform processing for receiving a question from a user, selecting a highly reliable information source extracted by the highly-reliable-information-source extracting means in accordance with a category of the question, transferring the question to an information source registered as the selected highly reliable information source, and transferring an answer obtained from the information source to the user.

18. An information processor according to claim 1, wherein, when data from a highly reliable information source extracted by the highly-reliable-information-source extracting means is used or is provided to a user, the information processor is arranged to perform billing processing as a charge of the use.

19. An information processor according to claim 1, further comprising information obtaining means for obtaining information provided from the information source,
wherein the information obtaining means is arranged to perform processing for receiving information sent from a terminal.

20. An information processor according to claim 1, further comprising information obtaining means for obtaining information provided from the information source,
wherein the information obtaining means is arranged to perform processing for receiving information sent from a terminal.

21. An information processor according to claim 1, further comprising verifying means for performing processing for verifying information sent from the information source.

22. An information processor according to claim 1, further comprising result obtaining means for obtaining result data corresponding to the information stored in the provided information database,
wherein the evaluation data obtaining means is arranged to obtain evaluation data created from a result of a comparison between the result data and the information.

23. An information processing method for storing information provided from different kinds of information sources in a provided information database and for executing processing on stored information, comprising:

an informaiton storing step for storing information provided from the information sources corresponding to data for identifying information providing sources in the provided information database;
an evaluation data obtaining step for obtaining evaluation data for the information stored in the provided information database;
a reliability computing step for computing reliability of the provided information based on the evaluation data, and updating provided information database by deleting the information having a reliability below a threshold;
a highly-reliable-information-source extracting step for extracting one or more a highly-reliable information sources from the information providing sources of the information stored in the updated provided information database based on the reliability data calculated by the reliability computing step, computing values of reliability for extracted highly-reliable information sources, and sorting the extracted highly-reliable information sources based on the computed values; and
a data transmitting step for trasmitting data from or concerning the one or more highly-reliable information sources extracted in the highly-reliable information source extracting step to at least one user.

24. An information processing method according to claim 23, further comprising the step of storing highly reliable information source data extracted by the highly reliable information source extracting step in a highly-reliable-providing-source-database.

25. An information processing method according to claim 23, further comprising the steps of newly calculating reliability data in the reliability computing step based on evaluation data newly obtained by the evaluation data obtaining step and of performing data update by storing the calculated reliability data in the provided information database.

26. An information processing method according to claim 23, further comprising the steps of comparing reliability of information stored in the provided information database and a predetermined threshold and deleting a file of the information if the reliability is lower than the threshold.

27. An information processing method according to claim 23, further comprising the steps of performing processing for receiving a question from a user, selecting a highly reliable information source extracted by the highly-reliable-information-source extracting means in accordance with a category of the question, transferring the question to an information source registered as the selected highly reliable information source, and transferring an answer obtained from the information source to the user.

28. An information processing method according to claim 23, comprising the step of, when data from a highly reliable information source extracted by the highly-reliable-information-source extracting means is used or is provided to a user, performing billing processing as a charge of the use.

29. A data communication terminal apparatus connected to an information processor having:
a provided information database storing information provided from the information sources corresponding to data for identifying information providing sources;
evaluation data obtaining means for obtaining evaluation data for the information stored in the provided information database;
reliability computing means for computing reliability of the provided information based on the evaluation data, and updating the provided information database by deleting the information having a reliability below a threshold;

highly-reliable-information-source extracting means for extracting one or more a highly-reliable information sources from the information providing sources of the information stored in the updated provided information database based on the reliability data calculated by the reliability computing means, computing values of reliability for extracted highly-reliable information sources, and sorting the extracted highly-reliable information sources based on the computer values; and data transmitting means for transmitting data from or concerning the one or more highly-reliable information sources extracted by the highly-reliable information source extracting means to at least one user, the data communication terminal apparatus comprising;

information obtaining means for obtaining the information from the information processor;

information disclosing means for performing processing for disclosing a content of the information to an evaluator who performs evaluation processing on the obtained information;

input means for inputting an evaluation for the information; and information sending means for sending the evaluation of the information to the information processor as the evaluation data.

30. A data communication terminal apparatus according to claim 29, wherein the evaluation data is satisfaction data, which is an evaluation input by the input means as a result of disclosing the information by the information disclosing means.

31. A data communication terminal apparatus according to claim 29, wherein the evaluation data is accomplishment data, which is an evaluation input by the input means as a result of disclosing the information by the information disclosing means.

32. A data processing method in a data communication terminal apparatus connected to an information processor, the method comprising:

an information obtaining step for obtaining informaiton from the information processor;

an information disclosing step for performing processing for disclosing a content of the information to an evaluator who performs evaluation processing on the obtained information;

an input step for inputting an evaluation for the information;

an information sending step for sending the evaluation of the information to the information processor as the evaluation data; and a data transmitting step for transmitting data from or concerning one or more a highly-reliable information sources to at least one user, wherein the highly-reliable information sources are sorted based on computed values of reliability for extracted highly-reliable information sources.

33. A data processing method in a data communication terminal apparatus connected to an information processor, the method comprising:

a question input step for inputting a question from the user;

a question sending step for sending the question to the information processor;

an answer receiving step for receiving an answer to the question from the information processor;

an answer presenting means for presenting an answer received by the answer receiving step to the user; and a data transmitting step for transmitting data from or concerning a one or more highly-reliable information sources to at least one user, wherein the highly-reliable information sources are sorted based on computed values of reliability for extracted highly-reliable information sources.

34. A program for, on a computer system, executing data processing in a data communication apparatus connected to an information processor, comprising:

an information obtaining step for obtaining information from the information processor;

an information disclosing step for performing processing for disclosing a content of the information to an evaluator who performs evaluation processing on the obtained information;

an input step for inputting an evaluation for the information;

an information sending step for sending the evaluation of the information to the information processor as the evaluation data; and a data transmitting step for transmitting data from or concerning one or more highly-reliable information sources to at least one user, wherein the highly-reliable information sources are sorted based on computed values of reliability for extracted highly-reliable information sources.

35. A program recording medium storing a program for, on a computer system, storing information provided from different kinds of information sources in a database and for executing processing on stored information, the program comprising;

an information storing step for storing in a provided information database information provided from information sources corresponding to data for identifying information providing sources;

an evaluation data obtaining step for obtaining evaluation data for the information stored in the provided information database;

a reliability computing step for computing reliability of the provided information based on the evaluation data, and updating the provided information database by deleting information having a reliability below a threshold;

a highly-reliable-information-source extracting step for extracting a one or more highly-reliable information sources from the information providing sources of the information stored in the updated provided information database on the reliability data calculated by the reliability computing step, computing values of reliability for extracted highly-reliable information sources, and sorting the extracted highly-reliable information sources based on the computed values; and a data transmitting step for transmitting data from or concerning the one or more highly-reliable information sources extracted by the one or more highly-reliable information sources to at least one user.

* * * * *

UNITED STATES PATENT AND TRADEMARK OFFICE
CERTIFICATE OF CORRECTION

PATENT NO. : 7,523,051 B2  Page 1 of 1
APPLICATION NO. : 10/343296
DATED : April 21, 2009
INVENTOR(S) : Tetsujiro Kondo et al.

It is certified that error appears in the above-identified patent and that said Letters Patent is hereby corrected as shown below:

On the Title page Add

Item

--(30)    Foreign Application Priority Data

May 31, 2001    JP    2001-164747.--

Signed and Sealed this

Ninth Day of June, 2009

JOHN DOLL
*Acting Director of the United States Patent and Trademark Office*